United States Patent
Niu et al.

(10) Patent No.: US 11,601,874 B2
(45) Date of Patent: Mar. 7, 2023

(54) UPLINK CARRIER ACCESS

(71) Applicant: ZTE Corporation, Guangdong (CN)

(72) Inventors: Li Niu, Guangdong (CN); Yajun Zhao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/457,424

(22) Filed: Dec. 2, 2021

(65) Prior Publication Data

US 2022/0095208 A1 Mar. 24, 2022

Related U.S. Application Data

(63) Continuation of application No. 16/685,608, filed on Nov. 15, 2019, now Pat. No. 11,224,008, which is a continuation of application No. PCT/CN2017/084706, filed on May 17, 2017.

(51) Int. Cl.
| | |
|---|---|
| *H04W 48/16* | (2009.01) |
| *H04B 17/318* | (2015.01) |
| *H04W 72/04* | (2009.01) |
| *H04W 74/08* | (2009.01) |
| *H04W 72/0453* | (2023.01) |

(52) U.S. Cl.
CPC .......... *H04W 48/16* (2013.01); *H04B 17/318* (2015.01); *H04W 72/0453* (2013.01); *H04W 74/0833* (2013.01); *H04W 74/0891* (2013.01)

(58) Field of Classification Search
CPC ............. H04W 48/16; H04W 72/0453; H04W 74/0833; H04W 74/0891; H04W 72/10; H04W 72/02; H04B 17/318
See application file for complete search history.

(56) References Cited

U.S. PATENT DOCUMENTS

| | | | |
|---|---|---|---|
| 7,047,009 B2 | 5/2006 | Laroia et al. |
| 8,526,374 B2 | 9/2013 | Damnjanovic et al. |
| 8,798,636 B2 | 8/2014 | Rao |
| 9,357,417 B2 | 5/2016 | Siomina et al. |
| 9,674,805 B2 | 6/2017 | Jang et al. |
| 9,775,141 B2 | 9/2017 | Nimbalker et al. |
| 10,218,466 B2 | 2/2019 | Yu et al. |

(Continued)

FOREIGN PATENT DOCUMENTS

| | | |
|---|---|---|
| CN | 103501521 A | 1/2014 |
| CN | 104601313 A | 5/2015 |

(Continued)

OTHER PUBLICATIONS

International Search Report and Written Opinion dated Feb. 1, 2018 for International Application No. PCT/CN2017/084706, filed on May 17, 2017 (9 pages).

(Continued)

*Primary Examiner* — Brian T O Connor
(74) *Attorney, Agent, or Firm* — Perkins Coie LLP

(57) ABSTRACT

One or more devices, systems, and/or methods for facilitating access to an uplink carrier are provided. For example, information corresponding to a plurality of uplink carriers may be received from a wireless node. An uplink carrier may be selected from the plurality of uplink carriers based upon the information. A request to access the uplink carrier may be transmitted to the wireless node.

20 Claims, 23 Drawing Sheets

(56) References Cited

U.S. PATENT DOCUMENTS

| | | |
|---|---|---|
| 11,224,008 B2* | 1/2022 | Niu .................. H04W 72/0453 |
| 2009/0245178 A1 | 10/2009 | Gholmieh et al. |
| 2011/0261763 A1 | 10/2011 | Chun et al. |
| 2012/0213089 A1 | 8/2012 | Shi et al. |
| 2012/0252477 A1 | 10/2012 | Rao |
| 2014/0098761 A1 | 4/2014 | Lee et al. |
| 2016/0242220 A1 | 8/2016 | Jung et al. |
| 2016/0295537 A1 | 10/2016 | Langereis |
| 2016/0337988 A1 | 11/2016 | Nan et al. |
| 2017/0019894 A1 | 1/2017 | Nimbalker et al. |
| 2018/0049181 A1 | 2/2018 | Wu |
| 2018/0213435 A1 | 7/2018 | Kim et al. |
| 2018/0324675 A1 | 11/2018 | Lee |
| 2019/0394702 A1 | 12/2019 | Hoglund et al. |
| 2020/0084709 A1 | 3/2020 | Niu et al. |

FOREIGN PATENT DOCUMENTS

| | | |
|---|---|---|
| EP | 2063659 A1 | 5/2009 |
| JP | 2011-120304 A | 6/2011 |
| JP | 2015-537422 A | 12/2015 |
| JP | 2017-505066 A | 2/2017 |
| KR | 10-2010-0081270 A | 7/2010 |
| KR | 10-2010-0137545 A | 12/2010 |
| KR | 10-2011-0054005 A | 5/2011 |
| KR | 10-2012-0002549 A | 1/2012 |
| KR | 10-2016-0114152 A | 10/2016 |
| RU | 2006123943 A | 1/2008 |
| WO | 2010/030935 A2 | 3/2010 |
| WO | 2010/124228 A2 | 10/2010 |
| WO | 2011/124009 A1 | 10/2011 |
| WO | 2011/124018 A1 | 10/2011 |
| WO | 2014/055878 A1 | 4/2014 |
| WO | 2015/116732 A1 | 8/2015 |
| WO | 2016/072216 A1 | 5/2016 |

OTHER PUBLICATIONS

Supplementary European Search Report for European Patent Application No. 17910226, dated Mar. 20, 2020, 2 pages.

Russian Search Report for Russian Patent Application No. 2019141612, dated May 28, 2020, 2 pages.

ZTE, "Consideration on the 4-step random access procedure," 3GPP TSG RAN WG2#98, R2-1704672, 3GPP, Hangzhou, China, May 15-19, 2017, 16 pages.

Huawei, et al. "WF on initial access with SUL," 3GPP TSG RAN WG1 Meeting #90, R1-1715152, Prague, Czech Republic, Aug. 21-25, 2017, 3 pages.

Supplemental Notice of Allowance dated Dec. 10, 2021 for U.S. Appl. No. 16/685,608, filed Nov. 15, 2019 (8 pages).

KIPO, Notice of Allowance for Korean Patent Application No. 10-2021-7029276, dated Aug. 24, 2022, 7 pages.

* cited by examiner

UPLINK CARRIER ACCESS

CROSS REFERENCE TO RELATED APPLICATIONS

This patent document is a continuation of and claims the benefit of priority to U.S. patent application Ser. No. 16/685,608, entitled "UPLINK CARRIER ACCESS", filed on Nov. 15, 2019, which is a continuation of International Patent Application No. PCT/CN2017/084706, filed on May 17, 2017. The entire contents of the before-mentioned patent applications are incorporated by reference as part of the disclosure of this application.

BACKGROUND

A communication link between wireless nodes, such as between a user equipment (UE) and a base station (BS), may be facilitated using one or more uplink carriers. For example, the UE may access an uplink carrier and use the uplink to transmit data to and/or through the B S. However, the uplink carrier may not always be available, may have limited and/or changing resources and/or may have limited and/or changing capabilities.

SUMMARY

In accordance with the present disclosure, one or more devices and/or methods for facilitating provision of access to an uplink carrier are provided. In an example, information corresponding to a plurality of uplink carriers may be received from a wireless node. An uplink carrier may be selected from the plurality of uplink carriers based upon the information. A request to access the uplink carrier may be transmitted to the wireless node.

In an example, a first uplink carrier may be selected from amongst the first uplink carrier and a second uplink carrier based upon a first priority corresponding to the first uplink carrier and a second priority corresponding to the second uplink carrier. A request to access the first uplink carrier may be transmitted to a wireless node.

In an example, a request to access an uplink carrier may be transmitted to a wireless node. The request may comprise an indication of the uplink carrier.

In an example, information corresponding to a plurality of uplink carriers may be transmitted to a wireless node.

In an example, a request to access an uplink carrier may be received from a wireless node. The request may comprise an indication of the uplink carrier. A response may be generated based upon whether the uplink carrier is available. The response may be transmitted to the wireless node.

In an example, an indication of an uplink carrier of a plurality of uplink carriers may be identified. A request to access the uplink carrier may be transmitted, based upon the indication, to a wireless node.

In an example, an indication of an uplink carrier may be transmitted to a wireless node.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

One or more computing devices and/or techniques for facilitating provision of access to one or more uplink carriers are provided. For example, a user equipment (UE) may connect to a (e.g., wireless communication) network via a base station (BS) of the network. The UE may have one or more cells. For example, the one or more cells may comprise a primary service cell and/or one or more secondary service cells. The primary service cell may be used to receive and/or send (e.g., secure) parameters and/or non-access stratum (NAS) mobility features. The one or more secondary service cells may be used to provide data service for the UE. Each cell may comprise a downlink carrier, and one or more cells may comprise an uplink carrier, but in some implementations, one or more cells may not comprise an uplink carrier. Thus, in such implementations, there may be more downlink carriers than uplink carriers, and systems that may use an uplink frequency band more than downlink frequency bands may be limited with (e.g., low) data rates, efficiency, etc. Thus, in accordance with one or more of the techniques presented herein, the provision of access to uplink carriers may be facilitated in a manner that allows for one or more cells of the UE to (e.g., each) have one (e.g., or more) downlink carrier and one or more (e.g., a plurality) of uplink carriers, and thus support scenarios in which uplink carriers of the UE (e.g., and/or of a cell of the UE) outnumber downlink carriers of the UE (e.g., and/or of a cell of the UE).

Figure 1:
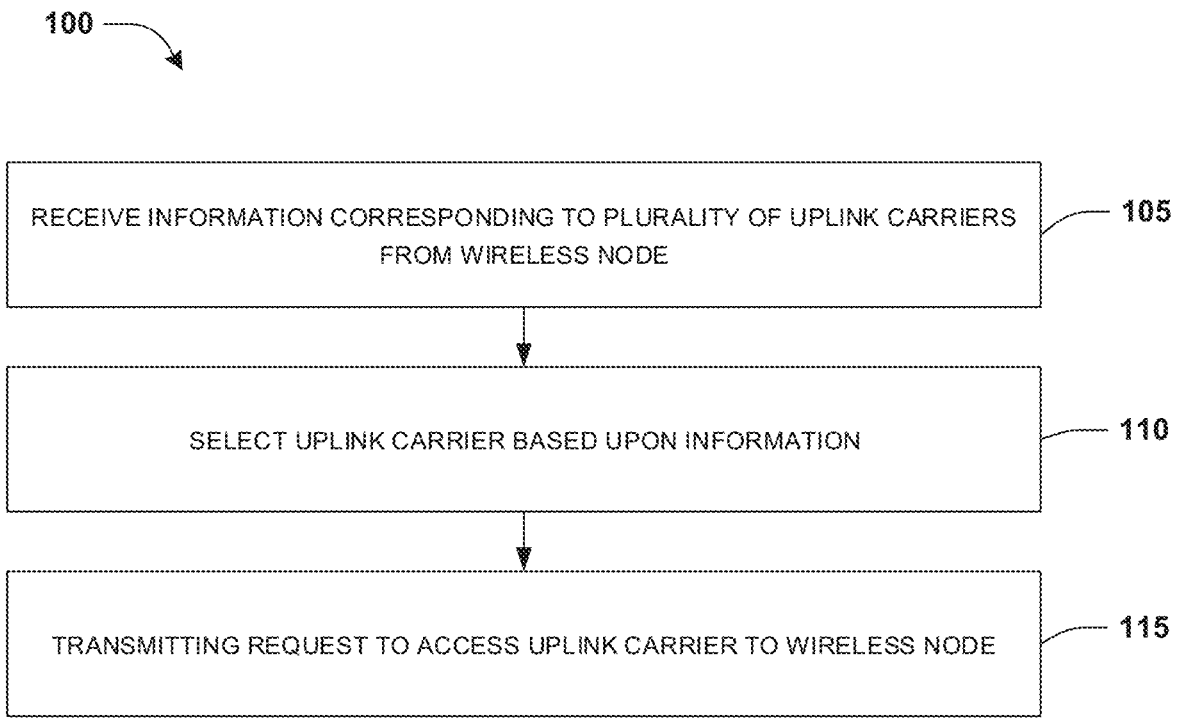
FIG. 1 is a flow chart illustrating an example method for facilitating transmission of a request to access an uplink carrier.

An example method 100 of facilitating transmission of a request to access an uplink carrier from a first wireless node to a second wireless node is illustrated in FIG. 1. The first wireless node may be a user equipment (UE) and the second wireless node may be a network and/or base station (BS). The first wireless node may (e.g., be required to) transmit one or more data packets to the second wireless node using an uplink carrier. Accordingly, at 105, the first wireless node receives information corresponding to a plurality of uplink carriers (e.g., from the second wireless node). An uplink carrier from the plurality of uplink carriers may be selected to be used for data transmission. Thus, at 110, the first wireless node may select the uplink carrier, from the plurality of uplink carriers, based upon the information received.

The information corresponding to the plurality of uplink carriers may allow the first wireless node to determine which uplink carrier of the plurality of uplink carriers, which the first wireless node can support, should be selected to be used for data transmission. The information (e.g., used to determine which uplink carrier to select) may comprise an indication of a frequency of the uplink carrier. Alternatively and/or additionally, the information may comprise a bandwidth of the uplink carrier. Alternatively and/or additionally, the information may comprise an extra-spectrum leakage of the uplink carrier. Alternatively and/or additionally, the information may comprise a priority of the uplink carrier. Alternatively and/or additionally, the information may comprise a maximum transmission power. The information may comprise one or more configurations, such as a random access channel (RACH) common configuration, a physical random access channel (PRACH) common configuration, a physical control channel (PUCCH) configuration, a physical shared channel (PUSCH) configuration, a sounding reference signal (SRS) common configuration, an upstream loop length configuration, a time alignment (TA) timer common configuration, and/or other information.

The first wireless node may (e.g., then) request to access the uplink carrier. Thus, at 115, the first wireless node may transmit a request to access the uplink carrier to the second wireless node. The first wireless node may transmit the request (e.g., to the second wireless node) using an (e.g., previously) accessed uplink carrier which the first wireless node may have already accessed. The first wireless node may transmit (e.g., to the second wireless node) a data packet comprising the request.

The request may comprise an indication of the uplink carrier. The indication of the uplink carrier may comprise the frequency of the uplink carrier. Alternatively and/or additionally, the indication of the uplink carrier may comprise an identification of the uplink carrier.

The second wireless node may (e.g., then) determine whether the uplink carrier is available (e.g., for the first wireless node to access). In response to determining that the uplink carrier is available (e.g., for the first wireless node to access), the second wireless node may transmit a confirmation message (e.g., to the first wireless node), corresponding to the request, indicating that the uplink carrier is available (e.g., for the first wireless node to access). The confirmation message may comprise a second indication of the uplink carrier. The second indication may comprise the frequency of the uplink carrier. Alternatively and/or additionally, the second indication may comprise a second identification of the uplink carrier. Alternatively and/or additionally, the confirmation message may comprise the configuration of the first wireless node on the uplink carrier (e.g., such as a RACH resource, PUSCH information, a PUCCH configuration, an SRS configuration, an uplink power exclusive configuration, a channel quality indicator (CQI) configuration, a scheduling request (SR) configuration, a TA timer common configuration and/or other information.

Upon the first wireless node receiving the confirmation message (e.g., from the second wireless node), the first wireless node may access the uplink carrier. Various scenarios wherein the first wireless node accesses the uplink carrier are contemplated. For example, if the second wireless node configures an exclusive RACH resource for the first wireless node, the first wireless node may initiate a (e.g., non-competitive) random access to the uplink carrier. Alternatively and/or additionally, if the second wireless node does not configure the exclusive RACH resource for the first wireless node, the first wireless node may initiate random access to the uplink carrier. Alternatively and/or additionally, if the second wireless node directly configures the first wireless node for the uplink carrier, the first wireless node may directly access the uplink carrier.

Upon the first wireless node accessing the uplink carrier, the first wireless node may transmit a completion message (e.g., to the second wireless node). The first wireless node may transmit the completion message via the uplink carrier. Upon the first wireless node transmitting the completion message, the first wireless node may use the uplink carrier for transmission of (e.g., further) data (e.g., to the second wireless node).

In response to determining that the uplink carrier is not available (e.g., for the first wireless node to access), the second wireless node may transmit a rejection message (e.g., to the first wireless node), corresponding to the request, indicating that the uplink carrier is not available (e.g., for the first wireless node to access). The rejection message may comprise the frequency of the uplink carrier and/or a cause of the rejection. In response to receiving the rejection message, the first wireless node may use the (e.g., previously) accessed uplink carrier for transmission of data (e.g., to the second wireless node).

In some examples, rather than transmitting the request (e.g., to the second wireless node) prior to accessing the uplink carrier, the first wireless node may access the uplink carrier in response to selecting the uplink carrier, and/or prior to transmitting the request. The first wireless node may (e.g., then) transmit the request to the second wireless node via the uplink carrier. The second wireless node may (e.g., then) determine whether the uplink carrier is available (e.g., for the first wireless node to access).

In some examples, the first wireless node may have a transmission problem. For example, the first wireless node may be unable to transmit data, at a desired rate, using the uplink carrier. When the transmission problem occurs and/or is detected (e.g., by the first wireless node and/or the second wireless node), the second wireless node may (e.g., directly) indicate a second (e.g., alternative) uplink carrier to the first wireless node by transmitting uplink carrier indication information (e.g., associated with the second uplink carrier) to the first wireless node.

The second wireless node may transmit the uplink carrier indication information in a radio resource control (RRC) message. Alternatively and/or additionally, the second wireless node may transmit the uplink carrier indication information in a physical downlink control channel (PDCCH) message. Alternatively and/or additionally, the second wireless node may transmit the uplink carrier indication information in a medium access control (MAC) control element (CE) message.

The uplink carrier indication information may comprise a frequency of the second uplink carrier and/or a configuration of the second uplink carrier. Upon receiving the uplink carrier indication information, the first wireless node may access the second uplink carrier. Various scenarios wherein the first wireless node accesses the second uplink carrier are contemplated. For example, if the second wireless node configures an exclusive RACH resource for the first wireless node, the first wireless node may initiate a (e.g., non-competitive) random access to the second uplink carrier. Alternatively and/or additionally, if the second wireless node directly configures the first wireless node for the second uplink carrier, the first wireless node may directly access the second uplink carrier.

Alternatively and/or additionally, when the transmission problem occurs, the first wireless node may select the second uplink carrier. Various scenarios wherein the transmission problem occurs and the first wireless node selects the second uplink carrier are contemplated. For example, when a determination is made that the first wireless node transmits a random access preamble (e.g., from MAC layer) to the uplink carrier a threshold (e.g., maximum) number of times, the first wireless node may transmit a second request (e.g., from RRC layer) to access the second uplink carrier to the second wireless node. Alternatively and/or additionally, when a determination is made that the first wireless node transmits a data packet (e.g., from radio link control (RLC) layer) to the uplink carrier a threshold (e.g., maximum) number of times, the first wireless node may transmit the second request (e.g., from RRC layer) to access the second uplink carrier to the second wireless node. Alternatively and/or additionally, when a determination is made that the uplink carrier is out of step (e.g., in association with a TA timer timeout), the first wireless node may transmit the second request (e.g., from RRC layer) to access the second uplink carrier to the second wireless node.

Figure 2:
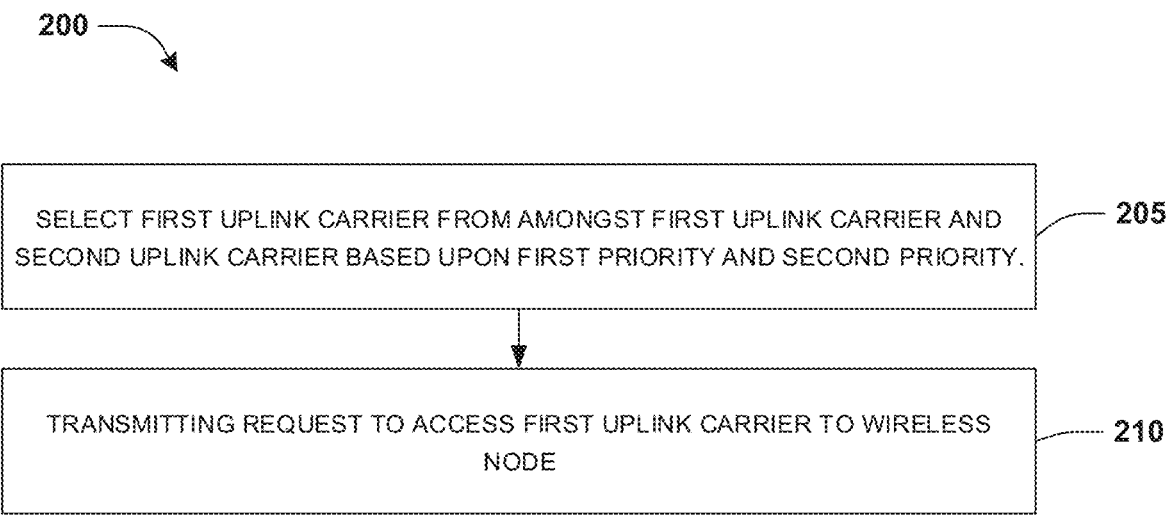
FIG. 2 is a flow chart illustrating an example method for facilitating transmission of a request to access an uplink carrier.

An example method 200 of facilitating transmission of a request to access an uplink carrier from a first wireless node to a second wireless node is illustrated in FIG. 2. The first wireless node may be a UE and the second wireless node may be a network and/or BS. The first wireless node may (e.g., be required to) transmit one or more data packets to the second wireless node using an uplink carrier. Accordingly, the first wireless node may receive information corresponding to a plurality of uplink carriers (e.g., from the second wireless node) comprising a first uplink carrier and a second uplink carrier. The information may comprise first information corresponding to the first uplink carrier and/or second information corresponding to the second uplink carrier.

The first wireless node may determine a first priority of the first uplink carrier based on the first information. The first information (e.g., used to determine the first priority) may comprise an indication of a frequency of the first uplink carrier. Alternatively and/or additionally, the first information may comprise a bandwidth of the first uplink carrier. Alternatively and/or additionally, the first information may comprise an extra-spectrum leakage of the first uplink carrier. Alternatively and/or additionally, the first information may comprise a maximum transmission power of the first uplink carrier. Alternatively and/or additionally, the first information may comprise the first priority of the first uplink carrier. The first information may comprise one or more configurations, such as a RACH common configuration, a PRACH common configuration, a PUCCH configuration, a PUSCH configuration, an SRS common configuration, an upstream loop length configuration, a TA timer common configuration and/or other information.

The first wireless node may determine a second priority of the second uplink carrier based on the second information. The second information (e.g., used to determine the second priority) may comprise an indication of a frequency of the second uplink carrier. Alternatively and/or additionally, the second information may comprise a bandwidth of the second uplink carrier. Alternatively and/or additionally, the second information may comprise an extra-spectrum leakage of the second uplink carrier. Alternatively and/or additionally, the second information may comprise a maximum transmission power of the second uplink carrier. Alternatively and/or additionally, the second information may comprise the second priority of the second uplink carrier. The second information may comprise one or more configurations, such as a RACH common configuration, a PRACH common configuration, a PUCCH configuration, a PUSCH configuration, an SRS common configuration, an upstream loop length configuration, a TA timer common configuration and/or other information).

The first priority may be determined based upon the frequency of the first uplink carrier and/or the second priority may be determined based upon the frequency of the second uplink carrier. Alternatively and/or additionally, the first priority may be determined based upon a load of the first uplink carrier and/or the second priority may be determined based upon a load of the second uplink carrier.

At 205, the first wireless node may select the first uplink carrier from amongst the first uplink carrier and the second uplink carrier, based upon the first priority and the second priority. The first wireless node may select the first uplink carrier based upon an application of the first priority and/or the second priority to one or more (e.g., defined) rules (e.g., stored on the first wireless node). For example, the first wireless node may select the first uplink carrier based upon a comparison of the first priority to the second priority.

Various scenarios wherein the first wireless node selects the first uplink carrier based upon a comparison of the first priority to the second priority are contemplated. For example, the first wireless node may select the first uplink carrier based upon a comparison of the first priority and the second priority, wherein the first priority is based upon the frequency of the first uplink carrier and the second priority is based upon the frequency of the second uplink carrier. Here, the frequency of the first uplink carrier may be lower than the frequency of the second uplink carrier. Alternatively and/or additionally, the first wireless node may select the first uplink carrier based upon a comparison of the first priority and the second priority, wherein the first priority is based upon the load of the first uplink carrier and the second priority is based upon the load of the second uplink carrier. Here, the load of the first uplink carrier may be lighter than the load of the second uplink carrier.

The first wireless node may (e.g., then) request to access the first uplink carrier. Thus, at 210, the first wireless node may transmit a request to access the first uplink carrier to the second wireless node. The first wireless node may transmit the request (e.g., to the second wireless node) using an (e.g., previously) accessed uplink carrier which the first wireless node may have already accessed. The first wireless node may transmit (e.g., to the second wireless node) a data packet comprising the request.

The request may comprise an indication of the first uplink carrier. The indication of the first uplink carrier may comprise the frequency of the first uplink carrier. Alternatively and/or additionally, the indication of the first uplink carrier may comprise an identification of the first uplink carrier.

The second wireless node may (e.g., then) determine whether the first uplink carrier is available (e.g., for the first wireless node to access). In response to determining that the first uplink carrier is available (e.g., for the first wireless node to access), the second wireless node may transmit a confirmation message (e.g., to the first wireless node), corresponding to the request, indicating that the first uplink carrier is available (e.g., for the first wireless node to access). The confirmation message may comprise a second indication of the first uplink carrier. The second indication may comprise the frequency of the first uplink carrier. Alternatively and/or additionally, the second indication may comprise a second identification of the first uplink carrier. Alternatively and/or additionally, the confirmation message may comprise the configuration of the first wireless node on the first uplink carrier (e.g., such as a RACH resource, PUSCH information, a PUCCH configuration, an SRS configuration, an uplink power exclusive configuration, a CQI configuration, a SR configuration, a TA timer common configuration and/or other information).

Upon the first wireless node receiving the confirmation message (e.g., from the second wireless node), the first wireless node may access the first uplink carrier. Various scenarios wherein the first wireless node accesses the first uplink carrier are contemplated. For example, if the second wireless node configures an exclusive RACH resource for the first wireless node, the first wireless node may initiate a (e.g., non-competitive) random access to the first uplink carrier. Alternatively and/or additionally, if the second wireless node does not configure the exclusive RACH resource for the first wireless node, the first wireless node may initiate random access to the first uplink carrier. Alternatively and/or additionally, if the second wireless node directly configures the first wireless node for the first uplink carrier, the first wireless node may directly access the first uplink carrier.

Upon the first wireless node accessing the first uplink carrier, the first wireless node may transmit a completion message (e.g., to the second wireless node). The first wireless node may transmit the completion message via the first uplink carrier. Upon the first wireless node transmitting the completion message, the first wireless node may use the first uplink carrier for transmission of (e.g., further) data (e.g., to the second wireless node).

In response to determining that the first uplink carrier is not available (e.g., for the first wireless node to access), the second wireless node may transmit a rejection message (e.g., to the first wireless node), corresponding to the request, indicating that the first uplink carrier is not available (e.g., for the first wireless node to access). The rejection message may comprise the frequency of the first uplink carrier and/or a cause of the rejection. In response to receiving the rejection message, the first wireless node may use the (e.g., previously) accessed uplink carrier for transmission of data (e.g., to the second wireless node).

In some examples, rather than transmitting the request (e.g., to the second wireless node) prior to accessing the first uplink carrier, the first wireless node may access the first uplink carrier in response to selecting the first uplink carrier, and/or prior to transmitting the request. The first wireless node may (e.g., then) transmit the request to the second wireless node via the first uplink carrier. The second wireless node may (e.g., then) determine whether the first uplink carrier is available (e.g., for the first wireless node to access).

In some examples, a change of the load of the first uplink carrier and/or a change of the frequency of the first uplink carrier may cause the first priority to change. For example, the first priority may be changed (e.g., by the first wireless node and/or the second wireless node) in response to receiving an indication of a change of the frequency of the first uplink carrier (e.g., from the second wireless node and/or the first wireless node). Alternatively and/or additionally, the first priority may be changed (e.g., by the first wireless node and/or the second wireless node) in response to receiving an indication of a change of the load of the first uplink carrier (e.g., from the second wireless node and/or the first wireless node). When a change of the first priority occurs and/or is determined (e.g., detected) (e.g., by the first wireless node and/or the second wireless node), the second wireless node may transmit third information corresponding to a plurality of uplink carriers (e.g., to the first wireless node). Upon receiving the third information, a third uplink carrier from the plurality of uplink carriers may be selected (e.g., by the first wireless node) to be used for data transmission. In some examples, the third information may comprise a selection threshold used in selecting the third uplink carrier.

Various scenarios wherein the selection threshold is used in selecting the third uplink carrier are contemplated. For example, if a received signal quality (e.g., Reference Signal Received Power (RSRP)) measured by the first wireless node (e.g., and/or associated with a downlink carrier) is below the selection threshold, the first wireless node may select an uplink carrier with a low frequency. Alternatively and/or additionally, if the received signal quality (e.g., RSRP) measured by the first wireless node is above the selection threshold, the first wireless node may select an uplink carrier with a high frequency. In some examples, the selection threshold is based upon a load of the third uplink carrier and/or the received signal quality (e.g., RSRP). The selection threshold may alternatively and/or additionally be based upon an offset value (e.g., received from the second wireless node), where the offset value may be modified (e.g., by the first wireless node and/or the second wireless node) to modify the selection threshold. In some examples, the selection threshold is based upon a combination, such as a sum, of the received signal quality (e.g., RSRP) and/or the offset value.

In some examples, the first wireless node may have a transmission problem. For example, the first wireless node may be unable to transmit data, at a desired rate, using the first uplink carrier. When the transmission problem occurs and/or is detected (e.g., by the first wireless node and/or the second wireless node), the second wireless node may (e.g., directly) indicate a fourth (e.g., alternative) uplink carrier to the first wireless node by transmitting uplink carrier indication information (e.g., associated with the second uplink carrier) to the first wireless node.

The second wireless node may transmit the uplink carrier indication information in an RRC message. Alternatively and/or additionally, the second wireless node may transmit the uplink carrier indication information in a PDCCH message. Alternatively and/or additionally, the second wireless node may transmit the uplink carrier indication information in a MAC CE message.

The uplink carrier indication information may comprise a frequency of the fourth uplink carrier and/or a configuration of the fourth uplink carrier. Upon receiving the uplink carrier indication information, the first wireless node may access the fourth uplink carrier. Various scenarios wherein the first wireless node accesses the fourth uplink carrier are contemplated. For example, if the second wireless node configures an exclusive RACH resource for the first wireless node, the first wireless node may initiate a (e.g., non-competitive) random access to the fourth uplink carrier. Alternatively and/or additionally, if the second wireless node directly configures the first wireless node for the fourth uplink carrier, the first wireless node may directly access the fourth uplink carrier.

Alternatively and/or additionally, when the transmission problem occurs, the first wireless node may select the fourth uplink carrier. Various scenarios wherein the transmission problem occurs and the first wireless node selects the fourth uplink carrier are contemplated. For example, when a determination is made that the first wireless node transmits a random access preamble (e.g., from MAC layer) to the uplink carrier a threshold (e.g., maximum) number of times, the first wireless node may transmit a second request (e.g., from RRC layer) to access the fourth uplink carrier to the second wireless node and/or may lower the priority of the uplink carrier. Alternatively and/or additionally, the offset value may be lowered by (e.g., at least) one step (e.g., by the first wireless node and/or the second wireless node), where the step may be configured (e.g., by the first wireless node and/or the second wireless node). Alternatively and/or additionally, when a determination is made that the first wireless node transmits a data packet (e.g., from RLC layer) to the uplink carrier a threshold (e.g., maximum) number of times, the first wireless node may transmit the second request (e.g., from RRC layer) to access the fourth uplink carrier to the second wireless node. Alternatively and/or additionally, when a determination is made that the fourth uplink carrier is out of step (e.g., in association with a TA timer timeout), the first wireless node may transmit the second request (e.g., from RRC layer) to access the second uplink carrier to the second wireless node.

Figure 3:
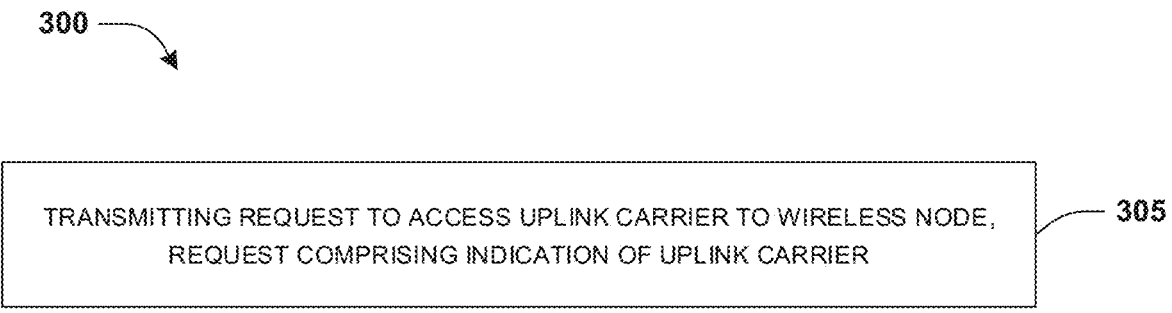
FIG. 3 is a flow chart illustrating an example method for facilitating transmission of a request to access an uplink carrier.

An example method 300 of facilitating transmission of a request to access an uplink carrier from a first wireless node to a second wireless node is illustrated in FIG. 3. The first wireless node may be a UE and the second wireless node may be a network and/or BS. The first wireless node may (e.g., be required to) transmit one or more data packets to the second wireless node using an uplink carrier. Accordingly, the first wireless node receives information corresponding to a plurality of uplink carriers (e.g., from the second wireless node). An uplink carrier from the plurality of uplink carriers may be selected to be used for data transmission. Thus, the first wireless node may select the uplink carrier, from the plurality of uplink carriers, based upon the information received.

The first wireless node may (e.g., then) request to access the uplink carrier. Thus, at 305, the first wireless node may transmit a request to access the uplink carrier to the second wireless node, wherein the request comprises an indication of the uplink carrier. The indication of the uplink carrier may comprise the frequency of the uplink carrier. Alternatively and/or additionally, the indication of the uplink carrier may comprise an identification of the uplink carrier.

Figure 4:
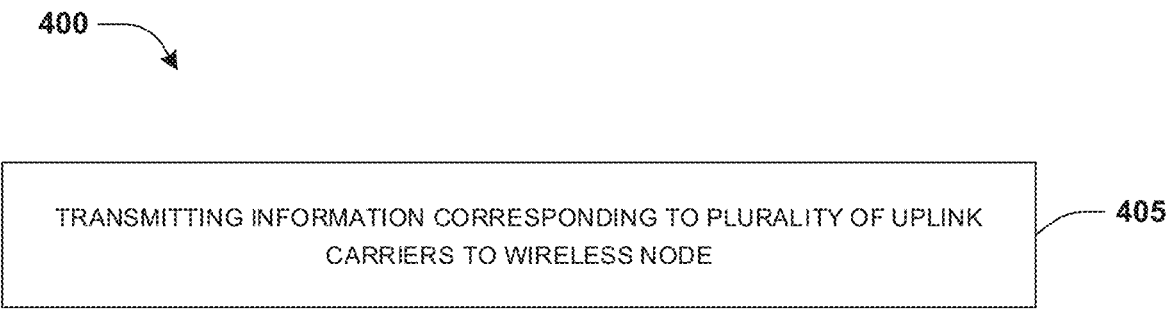
FIG. 4 is a flow chart illustrating an example method for facilitating transmission of information corresponding to a plurality of uplink carriers.

An example method 400 of facilitating transmission of information corresponding to a plurality of uplink carriers from a second wireless node to a first wireless node is illustrated in FIG. 4. The first wireless node may be a UE and the second wireless node may be a network and/or BS. The second wireless node may (e.g., be required to) receive one or more data packets from the first wireless node using an uplink carrier. Accordingly, at 405, the second wireless node transmits information corresponding to a plurality of uplink carriers (e.g., to the first wireless node). The first wireless node may select the uplink carrier, from the plurality of uplink carriers, based upon the information transmitted.

The information corresponding to the plurality of uplink carriers may allow the first wireless node to determine which uplink carrier of the plurality of uplink carriers, which the first wireless node can support, should be selected to be used for data transmission. The information (e.g., used to determine which uplink carrier to select) may comprise an indication of a frequency of the uplink carrier. Alternatively and/or additionally, the information may comprise a bandwidth of the uplink carrier. Alternatively and/or additionally, the information may comprise an extra-spectrum leakage of the uplink carrier. Alternatively and/or additionally, the information may comprise a priority of the uplink carrier. Alternatively and/or additionally, the information may comprise a maximum transmission power. The information may comprise one or more configurations, such as a RACH common configuration, a PRACH common configuration, a PUCCH configuration, a PUSCH configuration, an SRS common configuration, an upstream loop length configuration, a TA timer common configuration and/or other information.

Figure 5:
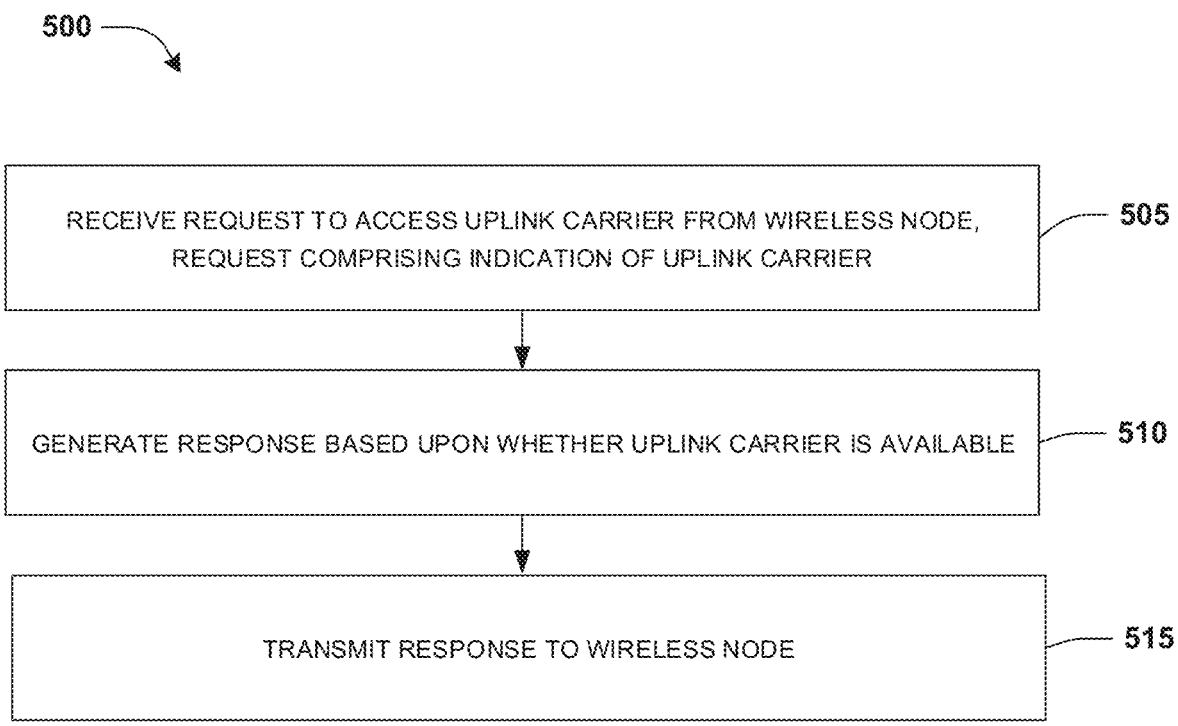
FIG. 5 is a flow chart illustrating an example method of a second wireless node responding to a request to access an uplink carrier transmitted by a first wireless node.

An example method 500 of a second wireless node responding to a request to access an uplink carrier transmitted by a first wireless node is illustrated in FIG. 5. The first wireless node may be a UE and the second wireless node may be a network and/or BS. The second wireless node may (e.g., be required to) receive one or more data packets from the first wireless node using an uplink carrier. Accordingly the second wireless node transmits information corresponding to a plurality of uplink carriers (e.g., to the first wireless node). The first wireless node may select the uplink carrier, from the plurality of uplink carriers, based upon the information transmitted.

The second wireless node may, at 505, receive a request to access the uplink carrier, wherein the request comprises an indication of the uplink carrier. The indication of the uplink carrier may comprise the frequency of the uplink carrier. Alternatively and/or additionally, the indication of the uplink carrier may comprise an identification of the uplink carrier.

The second wireless node may receive the request (e.g., from the first wireless node) using an (e.g., previously) accessed uplink carrier which the first wireless node may have already accessed. The second wireless node may receive (e.g., from the first wireless node) a data packet comprising the request.

The second wireless node may (e.g., then) determine whether the uplink carrier is available (e.g., for the first wireless node to access). At 510, the second wireless node may generate a response based upon whether the uplink carrier is available. For example, in response to determining that the uplink carrier is available (e.g., for the first wireless node to access), the second wireless node may generate a confirmation message, corresponding to the request.

At 515, the second wireless node may transmit the response to the first wireless node. For example, the second wireless node may transmit the confirmation message (e.g., to the first wireless node) indicating that the uplink carrier is available (e.g., for the first wireless node to access). The confirmation message may comprise a second indication of the uplink carrier. The second indication may comprise the frequency of the uplink carrier. Alternatively and/or additionally, the second indication may comprise a second identification of the uplink carrier. Alternatively and/or additionally, the confirmation message may comprise the configuration of the first wireless node on the uplink carrier (e.g., such as a RACH resource, PUSCH information, a PUCCH configuration, an SRS configuration, an uplink power exclusive configuration, a CQI configuration, a SR configuration, a TA timer common configuration and/or other information).

Upon the second wireless node transmitting the confirmation message (e.g., to the first wireless node), the first wireless node may access the uplink carrier. Various scenarios wherein the first wireless node accesses the uplink carrier are contemplated. For example, if the second wireless node configures an exclusive RACH resource for the first wireless node, the first wireless node may initiate a (e.g., non-competitive) random access to the uplink carrier. Alternatively and/or additionally, if the second wireless node does not configure the exclusive RACH resource for the first wireless node, the first wireless node may initiate random access to the uplink carrier. Alternatively and/or additionally, if the second wireless node directly configures the first wireless node for the uplink carrier, the first wireless node may directly access the uplink carrier.

Upon the first wireless node accessing the uplink carrier, the first wireless node may transmit a completion message (e.g., to the second wireless node). The first wireless node may transmit the completion message via the uplink carrier. Upon the first wireless node transmitting the completion message, the first wireless node may use the uplink carrier for transmission of (e.g., further) data (e.g., to the second wireless node).

In response to determining that the uplink carrier is not available (e.g., for the first wireless node to access), the second wireless node may generate a rejection message, corresponding to the request. The second wireless node may (e.g., then) transmit the rejection message (e.g., to the first wireless node) indicating that the uplink carrier is not available (e.g., for the first wireless node to access). The rejection message may comprise the frequency of the uplink carrier and/or a cause of the rejection. In response to receiving the rejection message, the first wireless node may use the (e.g., previously) accessed uplink carrier for transmission of data (e.g., to the second wireless node).

In some examples, rather than transmitting the request (e.g., to the second wireless node) prior to accessing the uplink carrier, the first wireless node may access the uplink carrier in response to selecting the uplink carrier, and/or prior to transmitting the request. The first wireless node may (e.g., then) transmit the request to the second wireless node via the uplink carrier. The second wireless node may (e.g., then) determine whether the uplink carrier is available (e.g., for the first wireless node to access).

In some examples, the first wireless node may have a transmission problem. For example, the first wireless node may be unable to transmit data, at a desired rate, using the uplink carrier. When the transmission problem occurs and/or is detected (e.g., by the first wireless node and/or the second wireless node), the second wireless node may (e.g., directly) indicate a second (e.g., alternative) uplink carrier to the first wireless node by transmitting uplink carrier indication information (e.g., associated with the second uplink carrier) to the first wireless node.

The second wireless node may transmit the uplink carrier indication information in an RRC message. Alternatively and/or additionally, the second wireless node may transmit the uplink carrier indication information in a PDCCH message. Alternatively and/or additionally, the second wireless node may transmit the uplink carrier indication information in a MAC CE message.

The uplink carrier indication information may comprise a frequency of the second uplink carrier and/or a configuration of the second uplink carrier. Upon receiving the uplink carrier indication information, the first wireless node may access the second uplink carrier. Various scenarios wherein the first wireless node accesses the second uplink carrier are contemplated. For example, if the second wireless node configures an exclusive RACH resource for the first wireless node, the first wireless node may initiate a (e.g., non-competitive) random access to the second uplink carrier. Alternatively and/or additionally, if the second wireless node directly configures the first wireless node for the second uplink carrier, the first wireless node may directly access the second uplink carrier.

Alternatively and/or additionally, when the transmission problem occurs, the first wireless node may select the second uplink carrier. Various scenarios wherein the transmission problem occurs and the first wireless node selects the second uplink carrier are contemplated. For example, when a determination is made that the first wireless node transmits a random access preamble (e.g., from MAC layer) to the uplink carrier a threshold (e.g., maximum) number of times, the first wireless node may transmit a second request (e.g., from RRC layer) to access the second uplink carrier to the second wireless node. Alternatively and/or additionally, when a determination is made that the first wireless node transmits a data packet (e.g., from RLC layer) to the uplink carrier a threshold (e.g., maximum) number of times, the first wireless node may transmit the second request (e.g., from RRC layer) to access the second uplink carrier to the second wireless node. Alternatively and/or additionally, when a determination is made (e.g., by the first wireless node and/or the second wireless node) that the uplink carrier is out of step (e.g., in association with a TA timer timeout), the first wireless node may transmit the second request (e.g., from RRC layer) to access the second uplink carrier to the second wireless node.

Figure 6A:
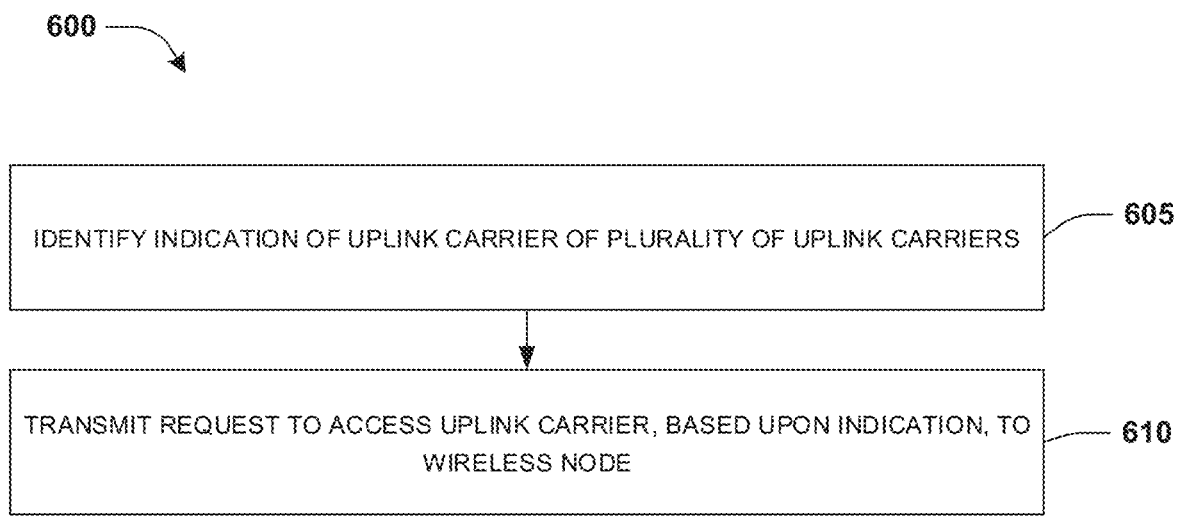
FIG. 6A is a flow chart illustrating an example method for facilitating transmission of a request to access an uplink carrier.

An example method 600 of facilitating transmission of a request to access an uplink carrier from a first wireless node to a second wireless node is illustrated in FIG. 6A. The first wireless node may be a UE and the second wireless node may be a network and/or BS. The first wireless node may (e.g., be required to) transmit one or more data packets to the second wireless node using an uplink carrier. Accordingly, the first wireless node receives information corresponding to a plurality of uplink carriers (e.g., from the second wireless node). An uplink carrier from the plurality of uplink carriers may be selected to be used for data transmission. Thus, the first wireless node may select the uplink carrier, from the plurality of uplink carriers, based upon the information received.

The information corresponding to the plurality of uplink carriers may allow the first wireless node to determine which uplink carrier of the plurality of uplink carriers, which the first wireless node can support, should be selected to be used for data transmission. The information (e.g., used to determine which uplink carrier to select) may comprise an indication of the uplink carrier. Thus, when the first wireless node receives the information, at 605, the first wireless node may identify the indication of the uplink carrier. The indication of the uplink carrier may comprise a frequency of the uplink carrier and/or an identification of the uplink carrier. Alternatively and/or additionally, the information may comprise a bandwidth of the uplink carrier. Alternatively and/or additionally, the information may comprise an extra-spectrum leakage of the uplink carrier. Alternatively and/or additionally, the information may comprise a priority of the uplink carrier. Alternatively and/or additionally, the information may comprise a maximum transmission power. The information may comprise a RACH resource, PUSCH information, a PUCCH configuration, an SRS configuration, uplink power exclusive configuration, a CQI configuration, a SR configuration, a TA timer common configuration and/or other information.

The first wireless node may (e.g., then) request to access the uplink carrier. Thus, at 610, the first wireless node may transmit a request to access the uplink carrier, based upon the indication of the uplink carrier, to the second wireless node. The request may comprise a second indication of the uplink carrier. The second indication may comprise the frequency of the uplink carrier. Alternatively and/or additionally, the second indication may comprise an identification of the uplink carrier.

The first wireless node may transmit the request (e.g., to the second wireless node) using an (e.g., previously) accessed uplink carrier which the first wireless node may have already accessed. The first wireless node may transmit (e.g., to the second wireless node) a data packet comprising the request.

Figure 6B:
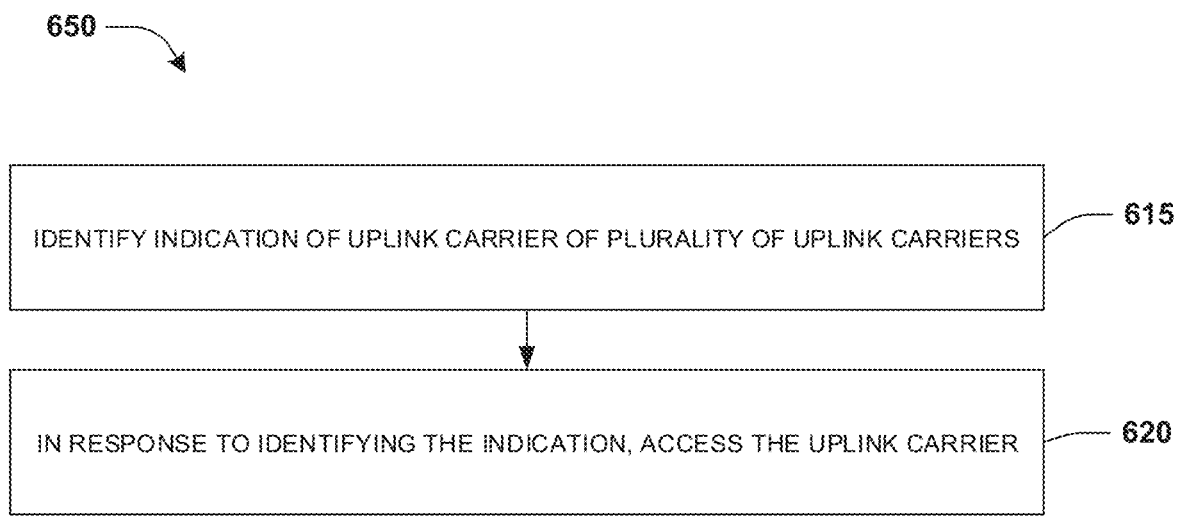
FIG. 6B is a flow chart illustrating an example method for facilitating transmission of a request to access an uplink carrier.

An example method 650 of facilitating transmission of a request to access an uplink carrier from a first wireless node to a second wireless node is illustrated in FIG. 6B. The first wireless node may be a UE and the second wireless node may be a network and/or BS. The first wireless node may (e.g., be required to) transmit one or more data packets to the second wireless node using an uplink carrier. Accordingly, the first wireless node receives information corresponding to a plurality of uplink carriers (e.g., from the second wireless node). An uplink carrier from the plurality of uplink carriers may be selected to be used for data transmission. Thus, the first wireless node may select the uplink carrier, from the plurality of uplink carriers, based upon the information received.

The information corresponding to the plurality of uplink carriers may allow the first wireless node to determine which uplink carrier of the plurality of uplink carriers, which the first wireless node can support, should be selected to be used for data transmission. The information (e.g., used to determine which uplink carrier to select) may comprise an indication of the uplink carrier. Thus, when the first wireless node receives the information, at 615, the first wireless node may identify the indication of the uplink carrier. The indication of the uplink carrier may comprise a frequency of the uplink carrier and/or an identification of the uplink carrier. Alternatively and/or additionally, the information may comprise a bandwidth of the uplink carrier. Alternatively and/or additionally, the information may comprise an extra-spectrum leakage of the uplink carrier. Alternatively and/or additionally, the information may comprise a priority of the uplink carrier. Alternatively and/or additionally, the information may comprise a maximum transmission power. The information may comprise a RACH resource, PUSCH information, a PUCCH configuration, an SRS configuration, uplink power exclusive configuration, a CQI configuration, a SR configuration, a TA timer common configuration and/or other information.

At 620, the first wireless node may access the uplink carrier in response to identifying the indication of the uplink carrier, and/or prior to transmitting a request to access the uplink carrier.

The first wireless node may (e.g., then) transmit the request to the second wireless node via the uplink carrier. The request may comprise a second indication of the uplink carrier. The second indication may comprise the frequency of the uplink carrier. Alternatively and/or additionally, the second indication may comprise an identification of the uplink carrier.

The second wireless node may (e.g., then) determine whether the uplink carrier is available (e.g., for the first wireless node to access). In response to determining that the uplink carrier is available (e.g., for the first wireless node to access), the second wireless node may transmit a confirmation message (e.g., to the first wireless node). Upon the first wireless node receiving the confirmation message, the first wireless node may transmit a completion message (e.g., to the second wireless node).

In response to determining that the uplink carrier is not available (e.g., for the first wireless node to access), the second wireless node may transmit a rejection message (e.g., to the first wireless node). In response to receiving the rejection message, the first wireless node may (e.g., cease accessing the uplink carrier and/or) use an initial uplink carrier which the first wireless node may have already (e.g., previously) accessed, for transmission of data (e.g., to the second wireless node).

Figure 7:
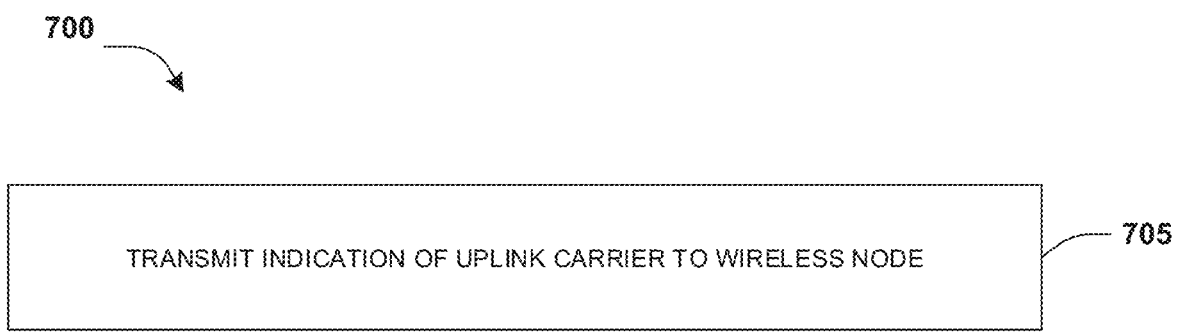
FIG. 7 is a flow chart illustrating an example method for facilitating transmission of an indication of an uplink carrier.

An example method 700 of facilitating transmission of an indication of an uplink carrier from a second wireless node to a first wireless node is illustrated in FIG. 7. The first wireless node may be a UE and the second wireless node may be a network and/or BS. The second wireless node may (e.g., be required to) receive one or more data packets from the first wireless node using an uplink carrier. Accordingly the second wireless node transmits information corresponding to a plurality of uplink carriers (e.g., to the first wireless node). The first wireless node may select the uplink carrier, from the plurality of uplink carriers, based upon the information transmitted.

In some examples, the first wireless node may have a transmission problem. For example, the first wireless node may be unable to transmit data, at a desired rate, using the uplink carrier. At 705, the second wireless node may transmit an indication of a second uplink carrier to the first wireless node. For example, when the transmission problem occurs and/or is determined (e.g., detected) (e.g., by the first wireless node and/or the second wireless node), the second wireless node may (e.g., directly) indicate the second (e.g., alternative) uplink carrier to the first wireless node by transmitting uplink carrier indication information (e.g., associated with the second uplink carrier) to the first wireless node.

The second wireless node may transmit the uplink carrier indication information in an RRC message. Alternatively and/or additionally, the second wireless node may transmit the uplink carrier indication information in a PDCCH message. Alternatively and/or additionally, the second wireless node may transmit the uplink carrier indication information in a MAC CE message.

The uplink carrier indication information may comprise a frequency of the second uplink carrier and/or a configuration of the second uplink carrier. Upon receiving the uplink carrier indication information, the first wireless node may access the second uplink carrier. Various scenarios wherein the first wireless node accesses the second uplink carrier are contemplated. For example, if the second wireless node configures an exclusive RACH resource for the first wireless node, the first wireless node may initiate a (e.g., non-competitive) random access to the second uplink carrier. Alternatively and/or additionally, if the second wireless node directly configures the first wireless node for the second uplink carrier, the first wireless node may directly access the second uplink carrier.

Figure 8:
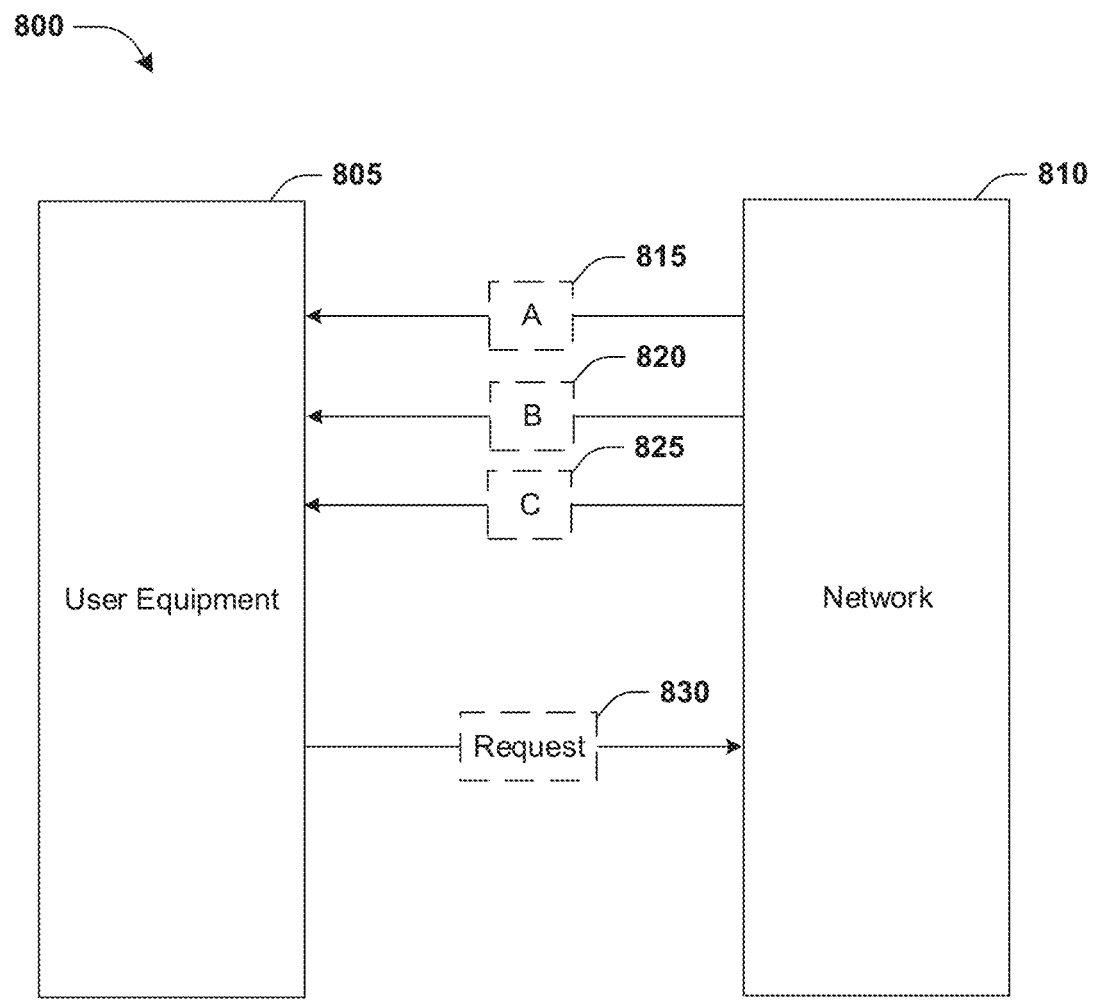
FIG. 8 is a component block diagram illustrating an example system for facilitating transmission of a request to access an uplink carrier.

FIG. 8 illustrates an example of a system 800 for facilitating transmission of a request to access an uplink carrier from a first wireless node 805 (e.g., UE) to a second wireless node 810 (e.g., network and/or BS). The first wireless node 805 may (e.g., be required to) transmit one or more data packets to the second wireless node 810 using an uplink carrier. Accordingly, the first wireless node 805 receives information corresponding to a plurality of uplink carriers (e.g., from the second wireless node 810). The information may comprise first information 815 corresponding to a first uplink carrier, second information 820 corresponding to a second uplink carrier and/or third information 825 corresponding to a third uplink carrier, wherein the first uplink carrier, the second uplink carrier and/or the third uplink carrier are comprised within the plurality of uplink carriers. An uplink carrier from the plurality of uplink carriers may be selected to be used for data transmission. Thus, the first wireless node 805 may select the uplink carrier, from the plurality of uplink carriers, based upon the information received.

The information corresponding to the plurality of uplink carriers may allow the first wireless node 805 to determine which uplink carrier of the plurality of uplink carriers, which the first wireless node 805 can support, should be selected to be used for data transmission. Accordingly, the first information 815, the second information 820 and/or the third information 825 may comprise an indication of a frequency, a bandwidth, an extra-spectrum leakage, a priority, a maximum transmission power and/or one or more configurations. The first wireless node 805 may then select the uplink carrier based upon the first information 815, the second information 820 and/or the third information 825.

The first wireless node 805 may (e.g., then) request to access the uplink carrier. Thus, the first wireless node 805 may transmit a request 830 to access the uplink carrier to the second wireless node 810, wherein the request 830 comprises an indication of the uplink carrier. The indication of the uplink carrier may comprise the frequency of the uplink carrier. Alternatively and/or additionally, the indication of the uplink carrier may comprise an identification of the uplink carrier.

The first wireless node 805 may transmit the request 830 (e.g., to the second wireless node 810) using an initial uplink carrier which the first wireless node 805 may have already (e.g, previously) accessed. The first wireless node 805 may transmit (e.g., to the second wireless node 810) a data packet comprising the request 830. The second wireless node 810 may (e.g., then) determine whether the uplink carrier is available (e.g., for the first wireless node 805 to access).

Figure 9:
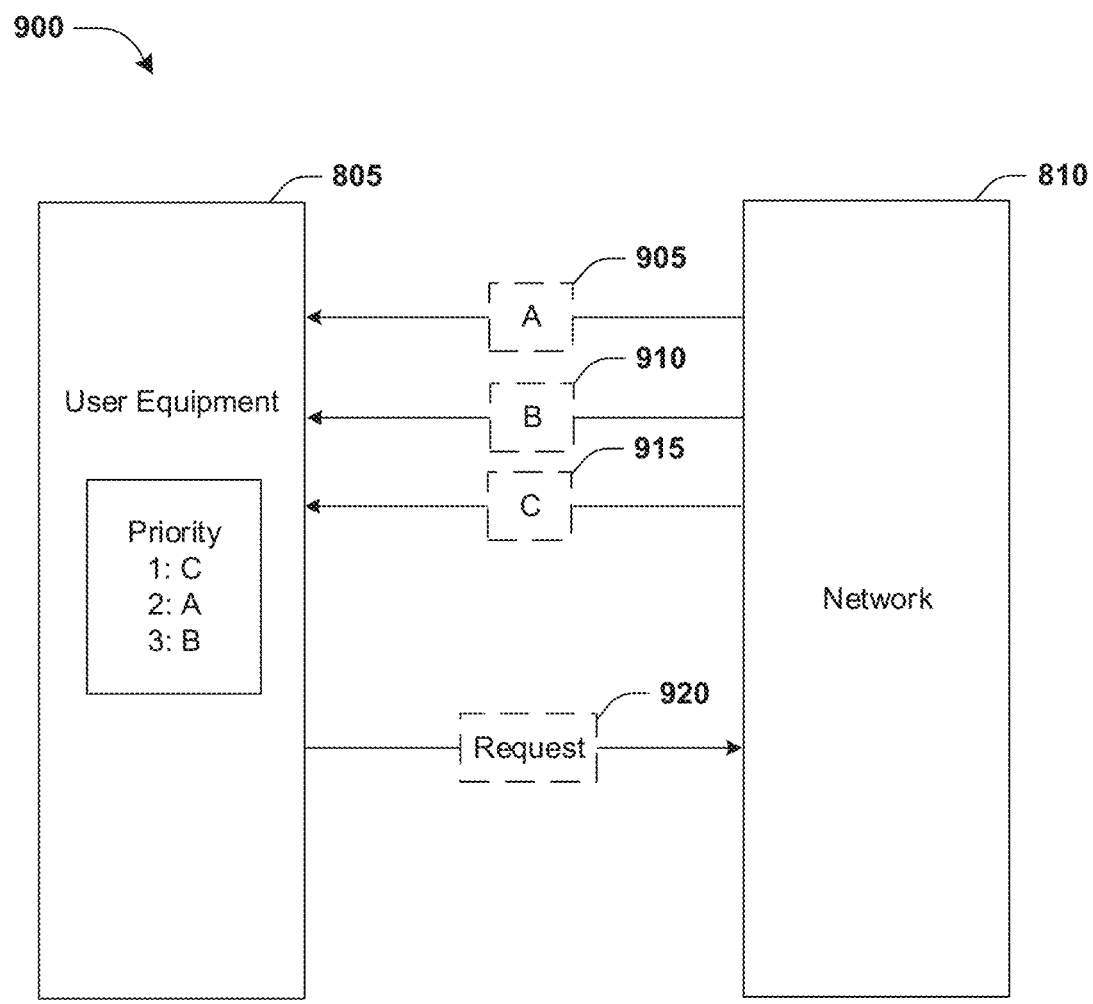
FIG. 9 is a component block diagram illustrating an example system for facilitating transmission of a request to access an uplink carrier.

FIG. 9 illustrates an example of a system 900 for facilitating transmission of a request to access an uplink carrier from the first wireless node 805 to the second wireless node 810. The first wireless node 805 may (e.g., be required to) transmit one or more data packets to the second wireless node 810 using an uplink carrier. Accordingly, the first wireless node 805 receives information corresponding to a plurality of uplink carriers (e.g., from the second wireless node 810). The information may comprise first information 905 corresponding to a first uplink carrier, second information 910 corresponding to a second uplink carrier and/or third information 915 corresponding to a third uplink carrier, wherein the first uplink carrier, the second uplink carrier and/or the third uplink carrier are comprised within the plurality of uplink carriers. An uplink carrier from amongst the first uplink carrier, the second uplink carrier and/or the third uplink carrier may be selected to be used for data transmission. Thus, the first wireless node 805 may select the uplink carrier, from the plurality of uplink carriers, based upon the information received.

The information corresponding to the plurality of uplink carriers may allow the first wireless node 805 to determine which uplink carrier of the plurality of uplink carriers, which the first wireless node 805 can support, should be selected to be used for data transmission. Accordingly, the first information 905, the second information 910 and/or the third information 915 may comprise an indication of a frequency, a bandwidth, an extra-spectrum leakage, a priority, a maximum transmission power and/or one or more configurations.

The first wireless node 805 may determine a first priority of the first uplink carrier based on the first information 905. The first wireless node 805 may determine a second priority of the second uplink carrier based on the second information 910. The first wireless node 805 may determine a third priority of the third uplink carrier based on the third information 915. Accordingly, the first wireless node 805 may determine that the third uplink carrier has a higher priority than the first uplink carrier and/or the first uplink carrier has a higher priority than the second uplink carrier. The first wireless node 805 may (e.g., then) select the third uplink carrier.

The first wireless node 805 may (e.g., then) request to access the third uplink carrier. Thus, the first wireless node 805 may transmit a request 920 to access the third uplink carrier to the second wireless node 810, wherein the request 920 comprises an indication of the third uplink carrier. The indication of the third uplink carrier may comprise the frequency of the third uplink carrier. Alternatively and/or additionally, the indication of the third uplink carrier may comprise an identification of the third uplink carrier.

The first wireless node 805 may transmit the request 920 (e.g., to the second wireless node 810) using an initial uplink carrier which the first wireless node 805 may have already (e.g, previously) accessed. The first wireless node 805 may transmit (e.g., to the second wireless node 810) a data packet comprising the request 920. The second wireless node 810 may (e.g., then) determine whether the uplink carrier is available (e.g., for the first wireless node 805 to access).

Figure 10:
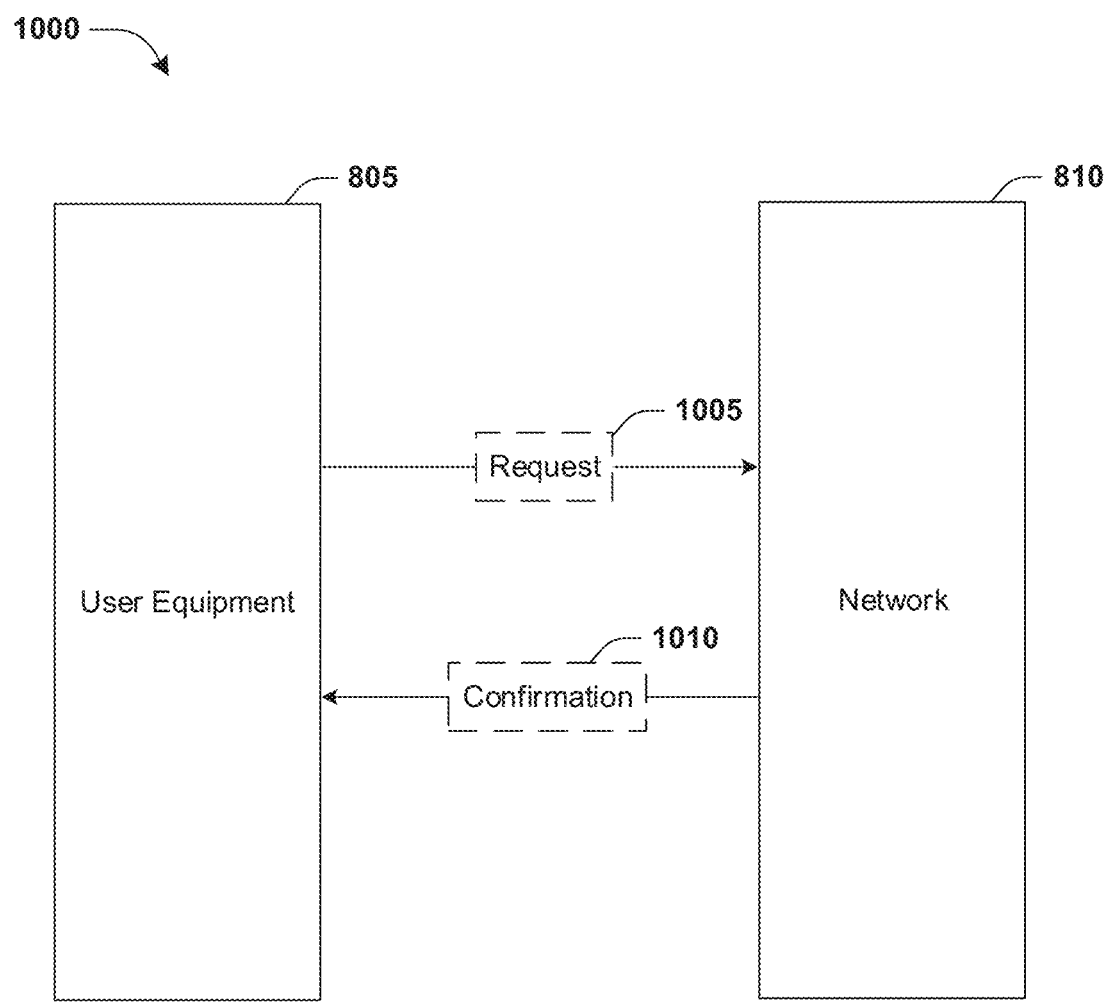
FIG. 10 is a component block diagram illustrating an example system for facilitating transmission of a request to access an uplink carrier.

FIG. 10 illustrates an example of a system 1000 for facilitating transmission of a request to access an uplink carrier from the first wireless node 805 to the second wireless node 810. The first wireless node 805 may (e.g., be required to) transmit one or more data packets to the second wireless node 810 using an uplink carrier. Accordingly, the first wireless node 805 may select the uplink carrier from a plurality of uplink carriers. The first wireless node 805 may (e.g., then) request to access the uplink carrier. Thus, the first wireless node 805 may transmit a request 1005 to access the uplink carrier to the second wireless node 810, wherein the request 1005 comprises an indication of the uplink carrier. The indication of the uplink carrier may comprise the frequency of the uplink carrier. Alternatively and/or additionally, the indication of the uplink carrier may comprise an identification of the uplink carrier.

The first wireless node 805 may transmit the request 1005 (e.g., to the second wireless node 810) using an initial uplink carrier which the first wireless node 805 may have already (e.g., previously) accessed. The first wireless node 805 may transmit (e.g., to the second wireless node 810) a data packet comprising the request 1005. The second wireless node 810 may (e.g., then) determine whether the uplink carrier is available (e.g., for the first wireless node 805 to access).

In response to determining that the uplink carrier is available (e.g., for the first wireless node 805 to access), the second wireless node 810 may transmit a confirmation message 1010 (e.g., to the first wireless node 805), corresponding to the request 1005, indicating that the uplink carrier is available (e.g., for the first wireless node 805 to access). The confirmation message 1010 may comprise a second indication of the uplink carrier. The second indication may comprise the frequency of the uplink carrier. Alternatively and/or additionally, the second indication may comprise a second identification of the uplink carrier. Alternatively and/or additionally, the confirmation message 1010 may comprise the configuration of the first wireless node 805 on the uplink carrier.

Upon the first wireless node 805 receiving the confirmation message 1010 (e.g., from the second wireless node 810), the first wireless node 805 may access the uplink carrier.

Figure 11:
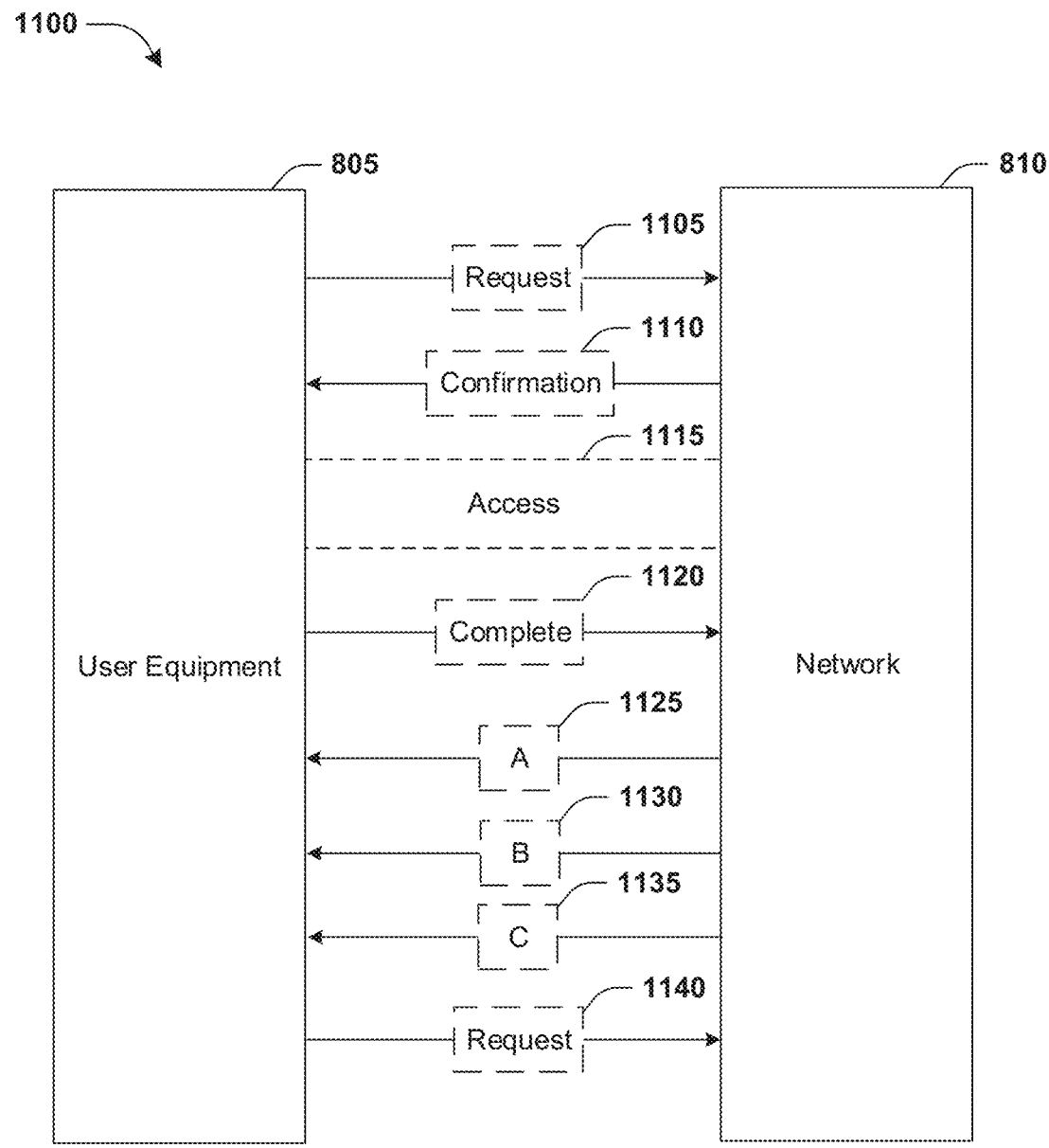
FIG. 11 is a component block diagram illustrating an example system for facilitating transmission of a request to access an uplink carrier.

FIG. 11 illustrates an example of a system 1100 for facilitating transmission of a request to access an uplink carrier from the first wireless node 805 to the second wireless node 810. The first wireless node 805 may transmit a request 1105 to access an uplink carrier to the second wireless node 810. In response to determining that the uplink carrier is available (e.g., for the first wireless node 805 to access), the second wireless node 810 may transmit a confirmation message 1110 (e.g., to the first wireless node 805), corresponding to the request 1105, indicating that the uplink carrier is available (e.g., for the first wireless node 805 to access).

Upon the first wireless node 805 receiving the confirmation message 1110 (e.g., from the second wireless node 810), the first wireless node 805 may access 1115 the uplink carrier. Upon accessing 1115 the uplink carrier, the first wireless node 805 may transmit a completion message 1120 (e.g., to the second wireless node 810). Upon the first wireless node 805 transmitting the completion message 1120, the first wireless node 805 may use the uplink carrier for transmission of (e.g., further) data (e.g., to the second wireless node 810).

In some examples, when the first wireless node 805 is using the uplink carrier for transmission of data, the second wireless node 810 may transmit information corresponding to a plurality of uplink carriers (e.g., to the first wireless node 805). The information may comprise first information 1125 corresponding to a first uplink carrier, second information 1130 corresponding to a second uplink carrier and/or third information 1135 corresponding to a third uplink carrier, wherein the first uplink carrier, the second uplink carrier and/or the third uplink carrier are comprised within the plurality of uplink carriers. A second uplink carrier from the plurality of uplink carriers may be selected to be used for data transmission. Thus, the first wireless node 805 may select the second uplink carrier, from the plurality of uplink carriers, based upon the information received.

The first wireless node 805 may (e.g., then) request to access the second uplink carrier. Thus, the first wireless node 805 may transmit a request 1140 to access the second uplink carrier to the second wireless node 810, wherein the request 1140 comprises an indication of the second uplink carrier.

Figure 12:
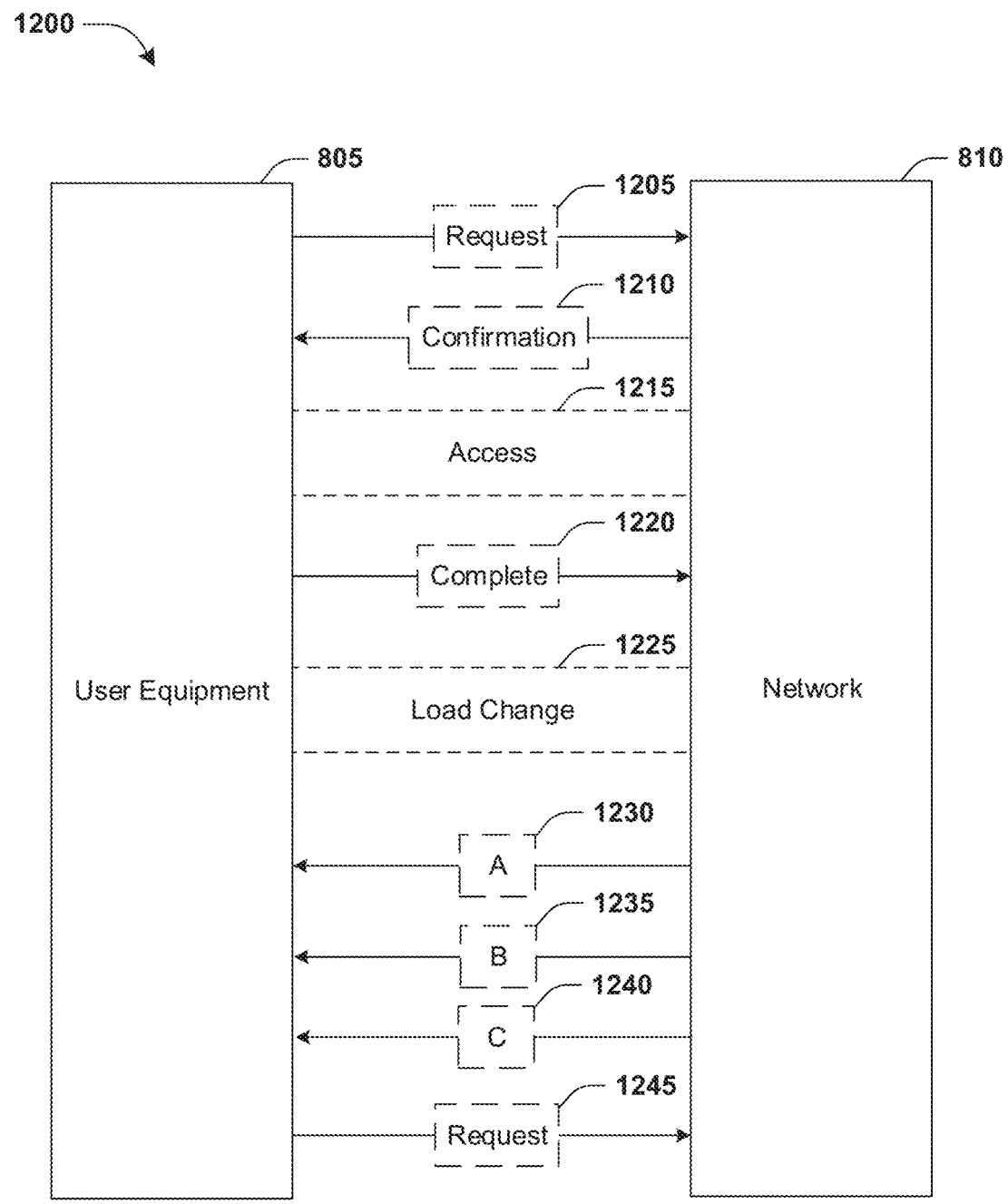
FIG. 12 is a component block diagram illustrating an example system for facilitating transmission of a request to access an uplink carrier.

FIG. 12 illustrates an example of a system 1200 for facilitating transmission of a request to access an uplink carrier from the first wireless node 805 to the second wireless node 810. The first wireless node 805 may transmit a request 1205 to access an uplink carrier to the second wireless node 810. In response to determining that the uplink carrier is available (e.g., for the first wireless node 805 to access), the second wireless node 810 may transmit a confirmation message 1210 (e.g., to the first wireless node 805).

Upon the first wireless node 805 receiving the confirmation message 1210 (e.g., from the second wireless node 810), the first wireless node 805 may access 1215 the uplink carrier. Upon accessing 1215 the uplink carrier, the first wireless node 805 may transmit a completion message 1220 (e.g., to the second wireless node 810). Upon the first wireless node 805 transmitting the completion message 1220, the first wireless node 805 may use the uplink carrier for transmission of (e.g., further) data (e.g., to the second wireless node 810).

In some examples, when the first wireless node 805 is using the uplink carrier for transmission of data, a load change 1225 occurs (e.g., in association with the uplink carrier). The load change 1225 may cause a change in a priority of the uplink carrier. When a change of the priority occurs and/or is determined (e.g., detected) (e.g., by the first wireless node 805 and/or the second wireless node 810), the second wireless node 810 may transmit information corresponding to a plurality of uplink carriers (e.g., to the first wireless node 805).

The information may comprise first information 1230 corresponding to a first uplink carrier, second information 1235 corresponding to a second uplink carrier and/or third information 1240 corresponding to a third uplink carrier, wherein the first uplink carrier, the second uplink carrier and/or the third uplink carrier are comprised within the plurality of uplink carriers. A fourth uplink carrier from the plurality of uplink carriers may be selected to be used for data transmission.

The first wireless node 805 may (e.g., then) request to access the fourth uplink carrier. Thus, the first wireless node 805 may transmit a request 1245 to access the fourth uplink carrier to the second wireless node 810.

Figure 13:
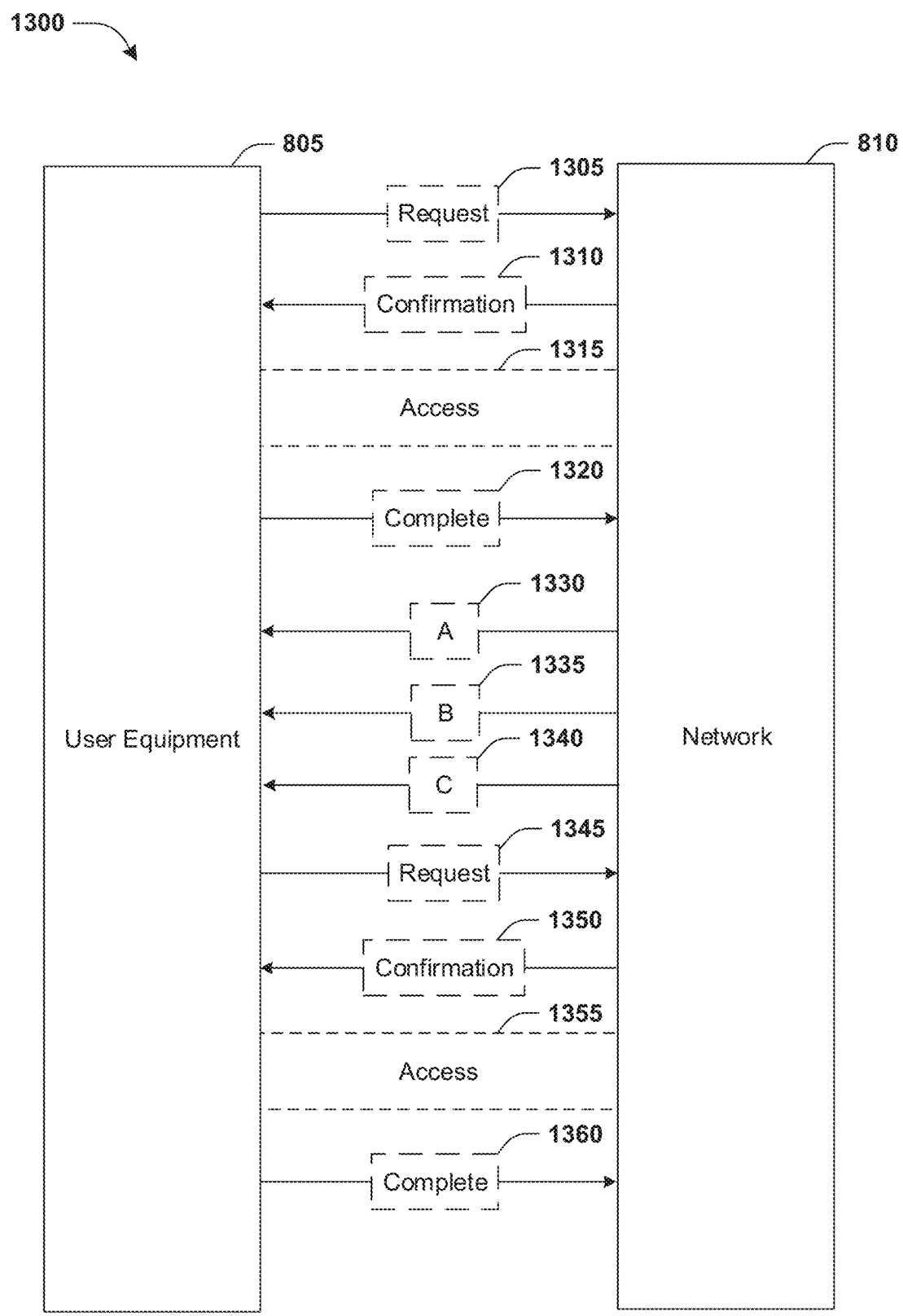
FIG. 13 is a component block diagram illustrating an example system for facilitating transmission of a request to access an uplink carrier.

FIG. 13 illustrates an example of a system 1300 for facilitating transmission of a request to access an uplink carrier from the first wireless node 805 to the second wireless node 810. The first wireless node 805 may transmit a request 1305 to access an uplink carrier to the second wireless node 810. In response to determining that the uplink carrier is available (e.g., for the first wireless node 805 to access), the second wireless node 810 may transmit a confirmation message 1310 (e.g., to the first wireless node 805).

Upon the first wireless node 805 receiving the confirmation message 1310 (e.g., from the second wireless node 810), the first wireless node 805 may access 1315 the uplink carrier. Upon accessing 1315 the uplink carrier, the first wireless node 805 may transmit a completion message 1320 (e.g., to the second wireless node 810).

In some examples, when the first wireless node 805 is using the uplink carrier for transmission of data, the second wireless node 810 may transmit information corresponding to a plurality of uplink carriers (e.g., to the first wireless node 805). The information may comprise first information 1330, second information 1335 and/or third information 1340 corresponding to the plurality of uplink carriers. A second uplink carrier from the plurality of uplink carriers may be selected to be used for data transmission. Thus, the first wireless node 805 may select the second uplink carrier, from the plurality of uplink carriers, based upon the information received.

The first wireless node 805 may (e.g., then) transmit a second request 1345 to access the second uplink carrier to the second wireless node 810. In response to determining that the second uplink carrier is available (e.g., for the first wireless node 805 to access), the second wireless node 810 may transmit a confirmation message 1350 (e.g., to the first wireless node 805). Upon the first wireless node 805 receiving the confirmation message 1350 (e.g., from the second wireless node 810), the first wireless node 805 may access 1355 the uplink carrier. Upon accessing 1355 the uplink carrier, the first wireless node 805 may transmit a completion message 1360 (e.g., to the second wireless node 810).

Figure 14:
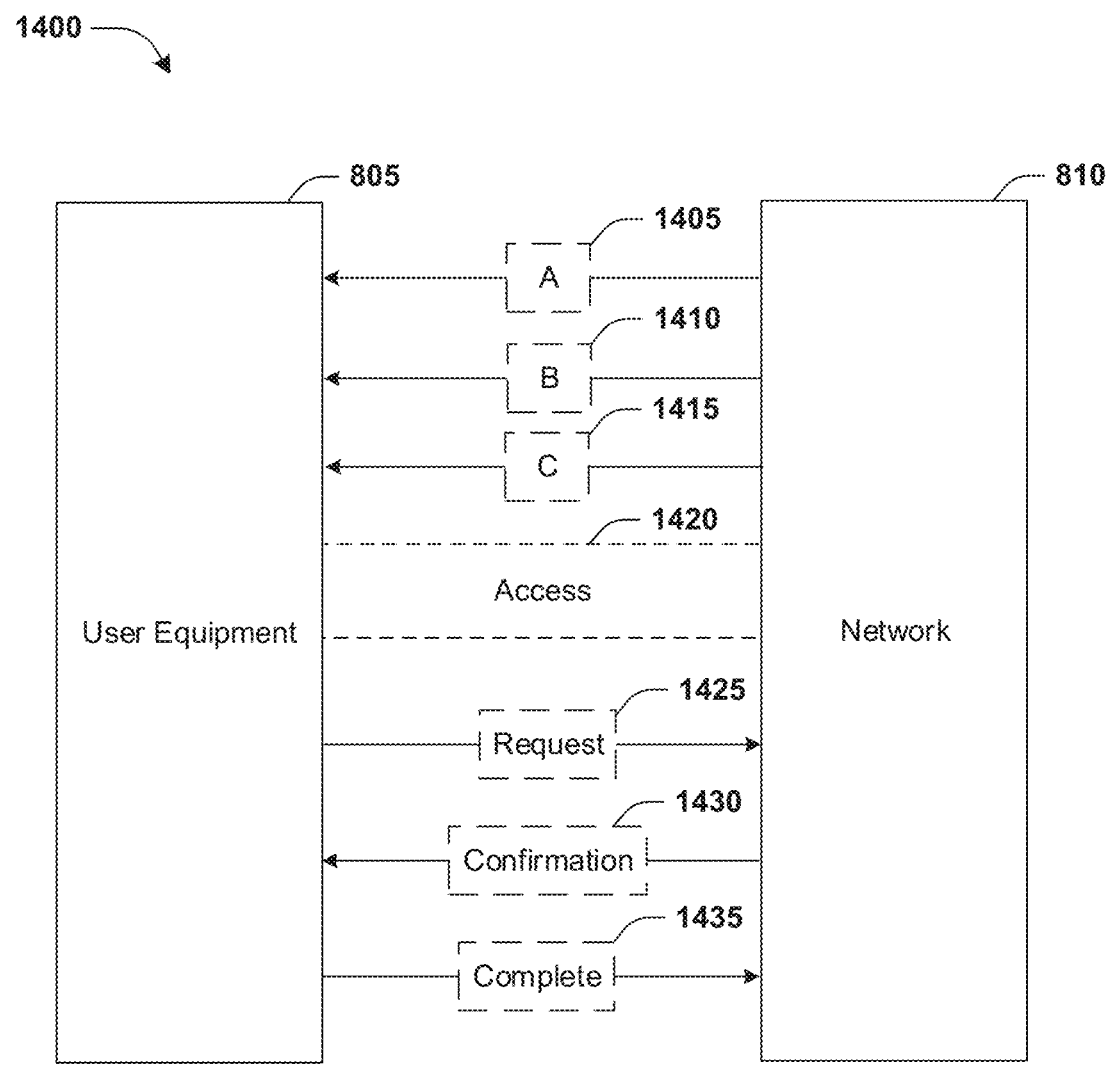
FIG. 14 is a component block diagram illustrating an example system for facilitating transmission of a request to access an uplink carrier.

FIG. 14 illustrates an example of a system 1400 for facilitating transmission of a request to access an uplink carrier from the first wireless node 805 to the second wireless node 810. In some examples, the second wireless node 810 may transmit information corresponding to a plurality of uplink carriers (e.g., to the first wireless node 805). The information may comprise first information 1405, second information 1410 and/or third information 1415 corresponding to the plurality of uplink carriers. An uplink carrier from the plurality of uplink carriers may be selected to be used for data transmission. Thus, the first wireless node 805 may select the uplink carrier, from the plurality of uplink carriers, based upon the information received.

The first wireless node 805 may (e.g., then) access 1420 the uplink carrier. In some examples, the accessing 1420 comprises initiating random access to the uplink carrier. The first wireless node 805 may then transmit a request 1425 to the second wireless node 810. In response to determining that the uplink carrier is available (e.g., for the first wireless node 805 to access), the second wireless node 810 may transmit a confirmation message 1430 (e.g., to the first wireless node 805). Upon the first wireless node 805 receiving the confirmation message 1430, the first wireless node 805 may transmit a completion message 1435 (e.g., to the second wireless node 810).

Figure 15:
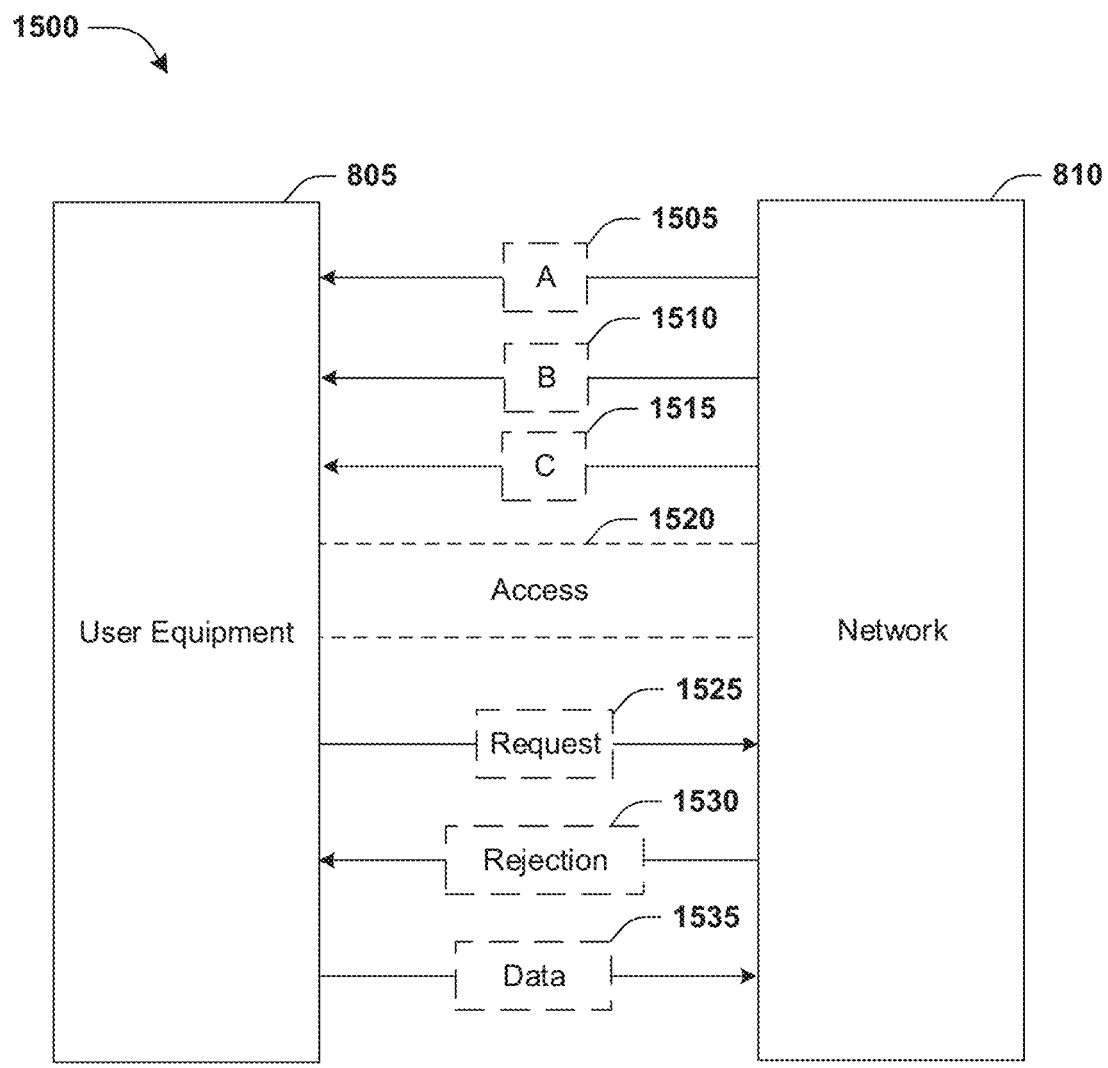
FIG. 15 is a component block diagram illustrating an example system for facilitating transmission of a request to access an uplink carrier.

FIG. 15 illustrates an example of a system 1500 for facilitating transmission of a request to access an uplink carrier from the first wireless node 805 to the second wireless node 810. In some examples, the second wireless node 810 may transmit information corresponding to a plurality of uplink carriers (e.g., to the first wireless node 805). The information may comprise first information 1505, second information 1510 and/or third information 1515 corresponding to the plurality of uplink carriers. An uplink carrier from the plurality of uplink carriers may be selected to be used for data transmission. Thus, the first wireless node 805 may select the uplink carrier, from the plurality of uplink carriers, based upon the information received.

The first wireless node 805 may (e.g., then) access 1520 the uplink carrier. In some examples, the accessing 1520 comprises initiating random access to the uplink carrier. The first wireless node 805 may then transmit a request 1525 to the second wireless node 810. In response to determining that the uplink carrier is not available (e.g., for the first wireless node 805 to access), the second wireless node 810 may transmit a rejection message 1530 (e.g., to the first wireless node 805). In response to receiving the rejection message 1530, the first wireless node 805 may (e.g., cease accessing the uplink carrier and/or) use an initial uplink carrier which the first wireless node 805 may have already (e.g., previously) accessed, for transmission of data 1535 (e.g., to the second wireless node).

Figure 16:
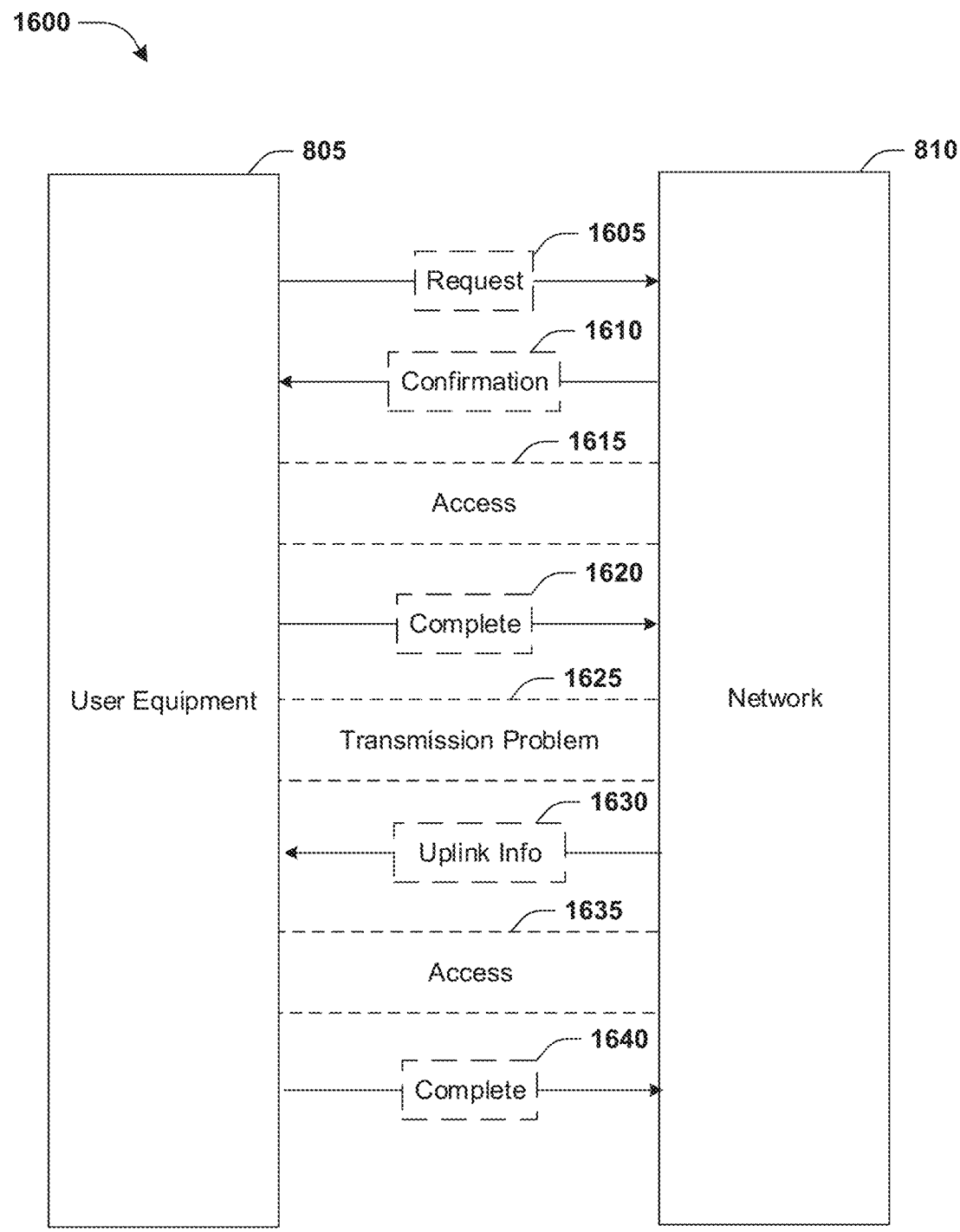
FIG. 16 is a component block diagram illustrating an example system for facilitating transmission of a request to access an uplink carrier.

FIG. 16 illustrates an example of a system 1600 for facilitating transmission of a request to access an uplink carrier from the first wireless node 805 to the second wireless node 810. The first wireless node 805 may transmit a request 1605 to access an uplink carrier to the second wireless node 810. In response to determining that the uplink carrier is available (e.g., for the first wireless node 805 to access), the second wireless node 810 may transmit a confirmation message 1610 (e.g., to the first wireless node 805).

Upon the first wireless node 805 receiving the confirmation message 1610 (e.g., from the second wireless node 810), the first wireless node 805 may access 1615 the uplink carrier. Upon accessing 1615 the uplink carrier, the first wireless node 805 may transmit a completion message 1620 (e.g., to the second wireless node 810).

In some examples, the first wireless node 805 may have a transmission problem 1625. For example, the first wireless node 805 may be unable to transmit data, at a desired rate, using the uplink carrier. The second wireless node 810 may (e.g., then) (e.g., directly) indicate a second (e.g., alternative) uplink carrier to the first wireless node by transmitting uplink carrier indication information 1630 (e.g., associated with the second uplink carrier) to the first wireless node.

The first wireless node 805 may (e.g., then) (e.g., directly) access 1635 the second uplink carrier. In some examples, the accessing 1635 comprises initiating random access to the second uplink carrier. Alternatively and/or additionally, the accessing 1635 comprises initiating non-competitive random access to the second uplink carrier. The first wireless node 805 may (e.g., then) transmit a second completion message 1640.

Figure 17:
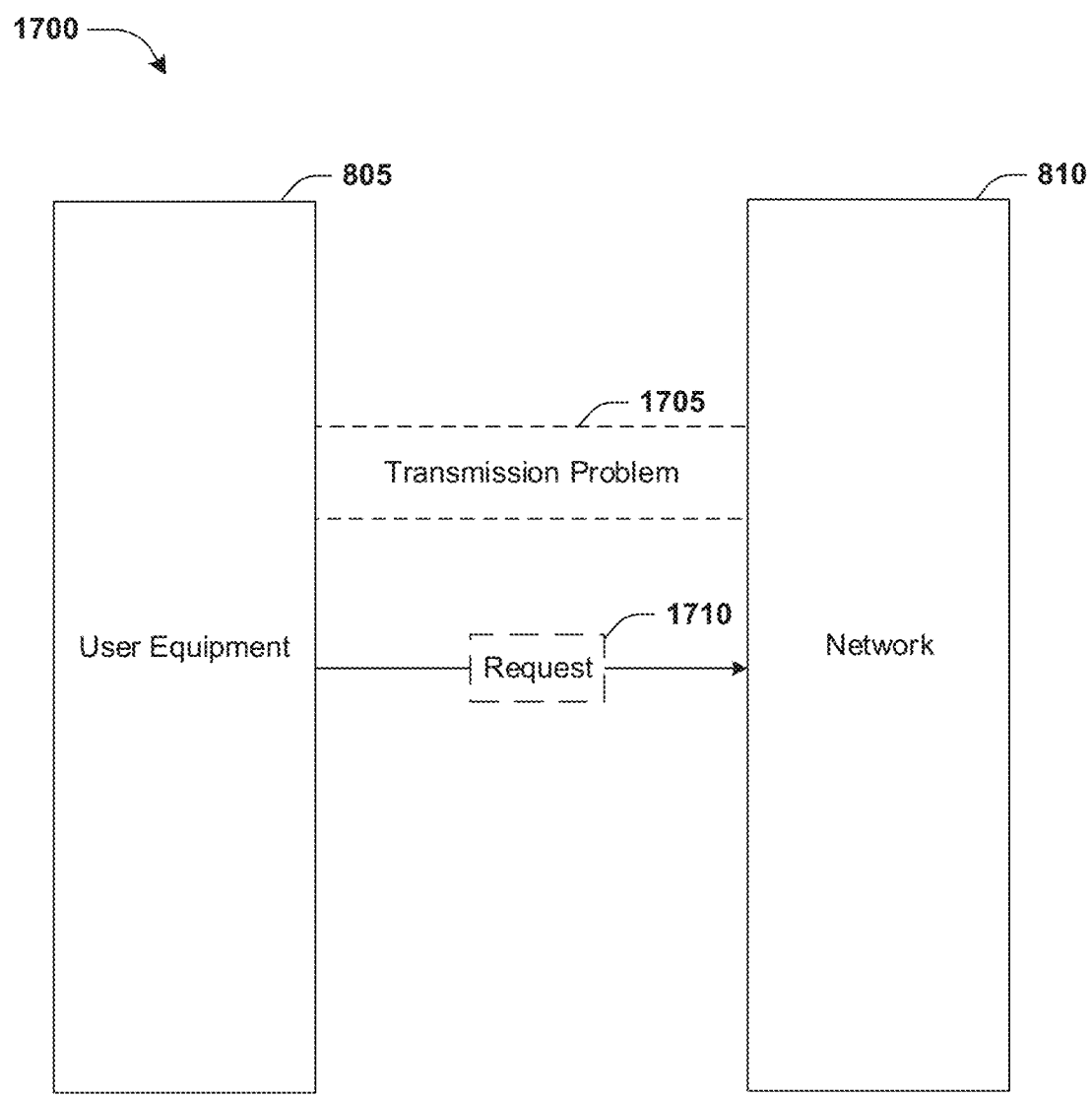
FIG. 17 is a component block diagram illustrating an example system for facilitating transmission of a request to access an uplink carrier.

FIG. 17 illustrates an example of a system 1700 for facilitating transmission of a request to access an uplink carrier from the first wireless node 805 to the second wireless node 810. In some examples, the first wireless node 805 may (e.g., be determined to) have a transmission problem 1705. For example, the first wireless node 805 may be unable to transmit data, at a desired rate, using an uplink carrier. In some examples, the transmission problem 1705 occurs when the first wireless node 805 transmits a random access preamble to the uplink carrier a threshold (e.g., maximum) number of times. Alternatively and/or additionally, the transmission problem 1705 occurs when the first wireless node 805 transmits a data packet to the uplink carrier a threshold (e.g., maximum) number of times. Alternatively and/or additionally, the transmission problem 1705 occurs when the uplink carrier is out of step (e.g., in association with a TA timer timeout). In response to determining the transmission problem 1705, the first wireless node 805 may transmit a request 1710 to access a second uplink carrier to the second wireless node 810.

Figure 18:
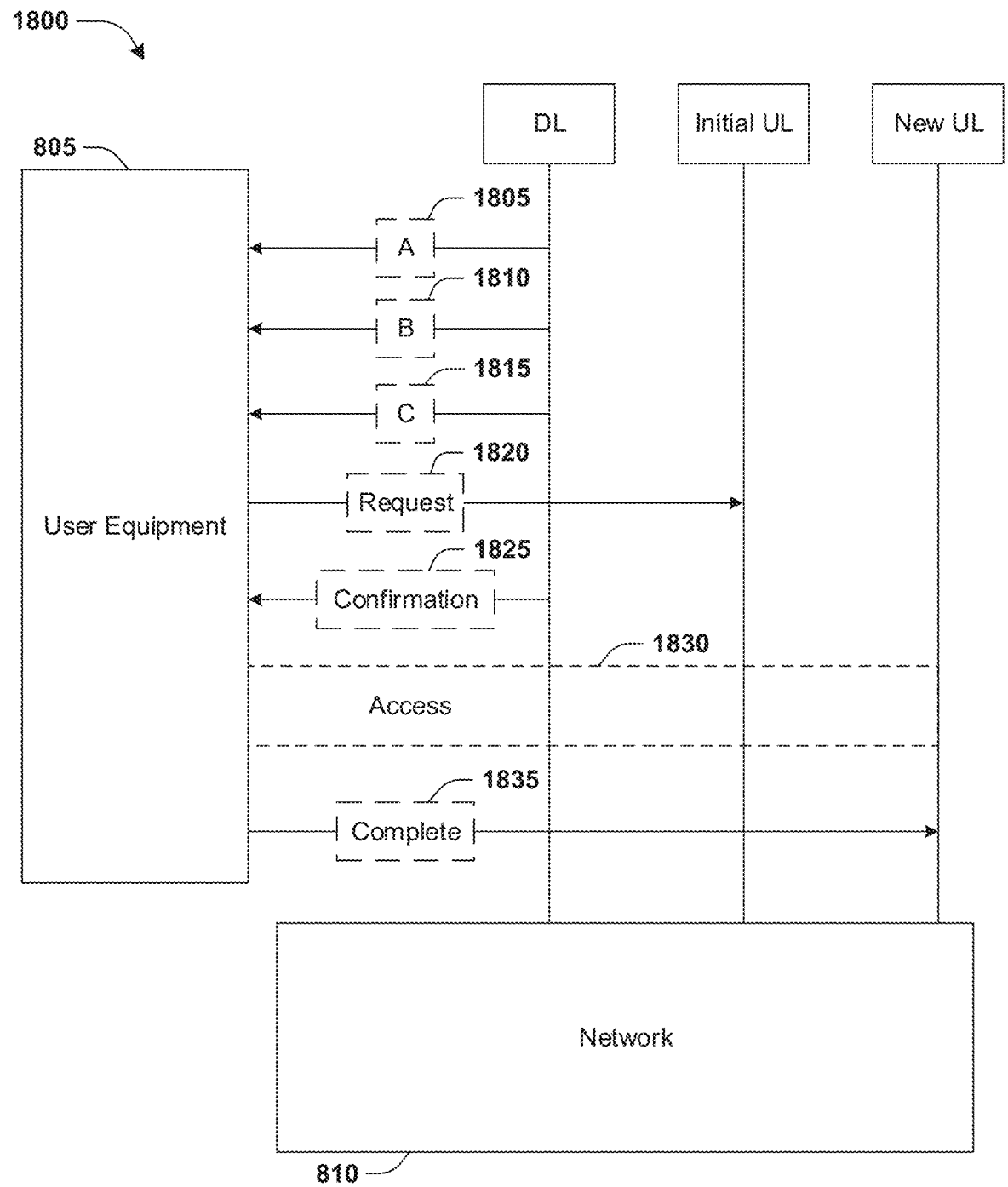
FIG. 18 is a component block diagram illustrating an example system for facilitating transmission of a request to access an uplink carrier.

FIG. 18 illustrates an example of a system 1800 for facilitating transmission of a request to access an uplink carrier from the first wireless node 805 to the second wireless node 810. The second wireless node 810 may transmit information corresponding to a plurality of uplink carriers (e.g., to the first wireless node 805). The information may be transmitted using a downlink carrier. The information may comprise first information 1805, second information 1810 and/or third information 1815 corresponding to the plurality of uplink carriers. An uplink carrier from the plurality of uplink carriers may be selected to be used for data transmission. Thus, the first wireless node 805 may select the uplink carrier, from the plurality of uplink carriers, based upon the information received.

The first wireless node 805 may (e.g., then) transmit a request 1820 to access the uplink carrier to the second wireless node 810. The request 1820 may be transmitted using an initial uplink carrier that was (e.g., previously) accessed. In response to determining that the uplink carrier is available (e.g., for the first wireless node 805 to access), the second wireless node 810 may transmit a confirmation message 1825 (e.g., to the first wireless node 805). The confirmation message 1825 may be transmitted using the downlink carrier. Upon the first wireless node 805 receiving the confirmation message 1825 (e.g., from the second wireless node 810), the first wireless node 805 may access 1830 the uplink carrier. The accessing 1830 may be associated with the downlink carrier, the initial uplink carrier and/or the uplink carrier. Upon accessing 1830 the uplink carrier, the first wireless node 805 may transmit a completion message 1835 (e.g., to the second wireless node 810). The completion message 1835 may be transmitted using the uplink carrier.

Figure 19:
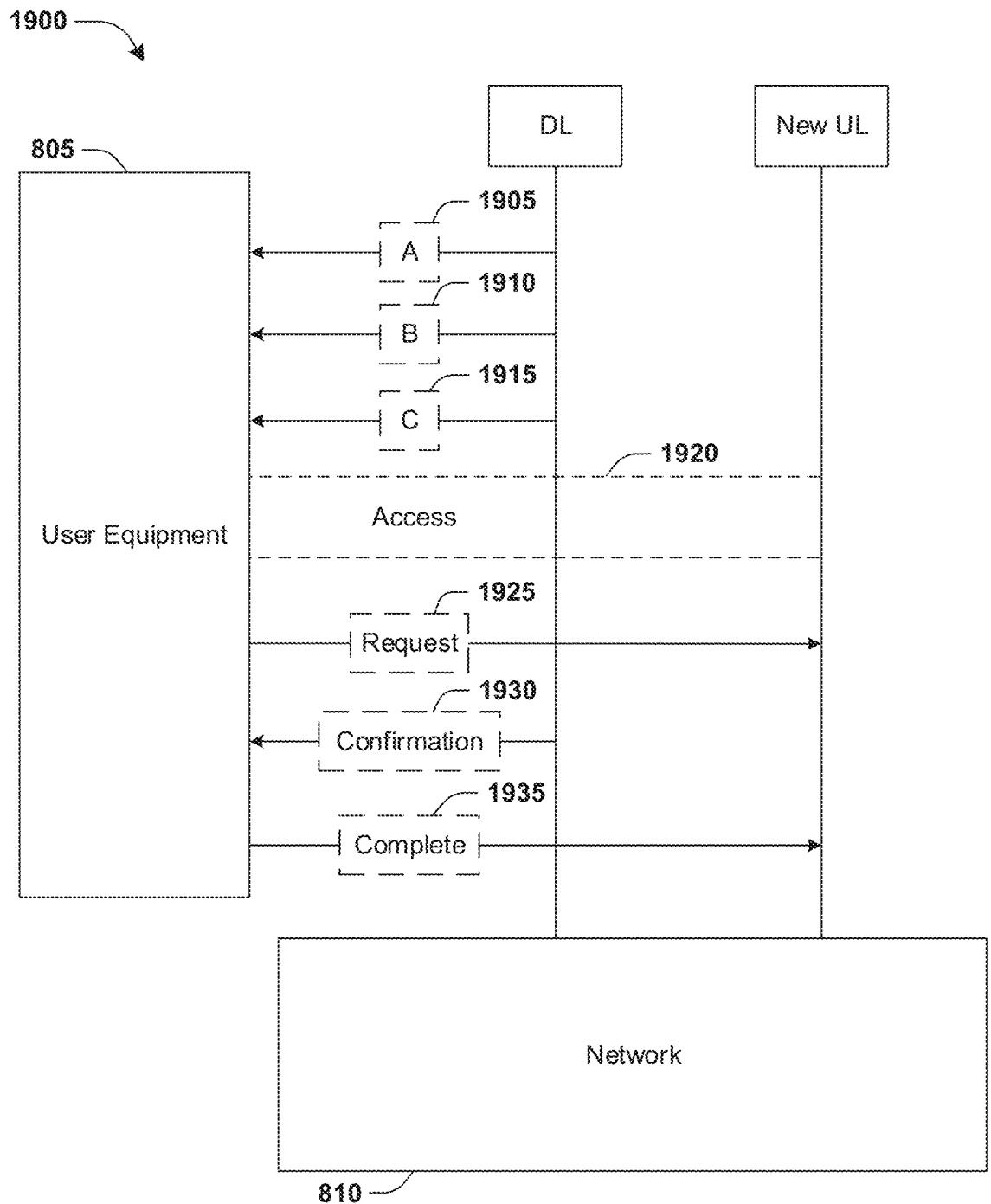
FIG. 19 is a component block diagram illustrating an example system for facilitating transmission of a request to access an uplink carrier.

FIG. 19 illustrates an example of a system 1900 for facilitating transmission of a request to access an uplink carrier from the first wireless node 805 to the second wireless node 810. The second wireless node 810 may transmit information corresponding to a plurality of uplink carriers (e.g., to the first wireless node 805). The information may be transmitted using a downlink carrier. The information may comprise first information 1905, second information 1910 and/or third information 1915 corresponding to the plurality of uplink carriers. An uplink carrier from the plurality of uplink carriers may be selected to be used for data transmission. Thus, the first wireless node 805 may select the uplink carrier, from the plurality of uplink carriers, based upon the information received.

The first wireless node 805 may (e.g., then) access 1920 the uplink carrier. In some examples, the accessing 1920 comprises initiating random access to the uplink carrier. The accessing 1920 may be associated with the downlink carrier and/or the uplink carrier. The first wireless node 805 may then transmit a request 1925 to the second wireless node 810. The request 1925 may be transmitted using the uplink carrier. In response to determining that the uplink carrier is available (e.g., for the first wireless node 805 to access), the second wireless node 810 may transmit a confirmation message 1930 (e.g., to the first wireless node 805). The confirmation message 1930 may be transmitted using the downlink carrier. Upon the first wireless node 805 receiving the confirmation message 1930, the first wireless node 805 may transmit a completion message 1935 (e.g., to the second wireless node 810). The completion message 1935 may be transmitted using the uplink carrier.

Figure 20:
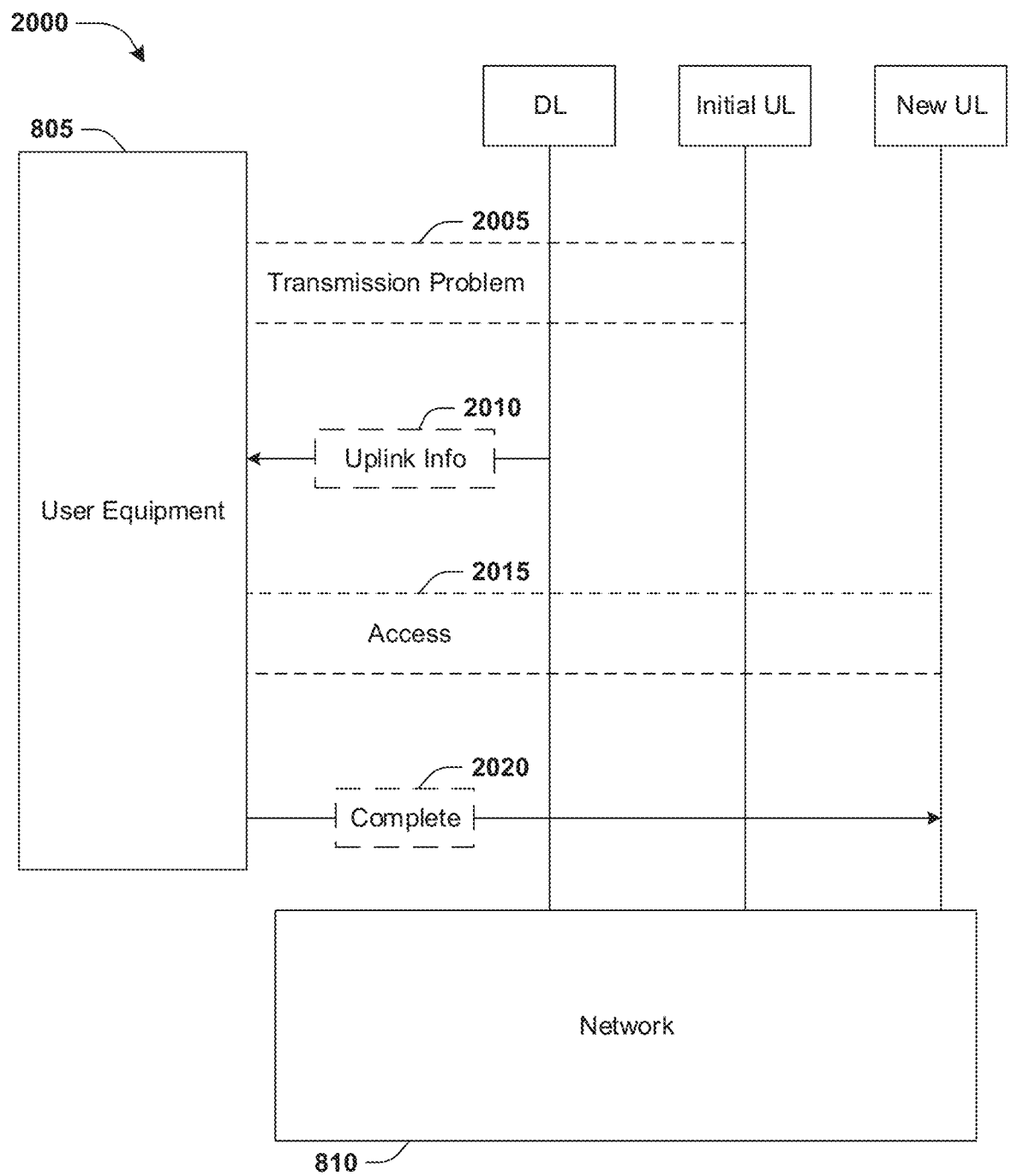
FIG. 20 is a component block diagram illustrating an example system for facilitating transmission of a request to access an uplink carrier.

FIG. 20 illustrates an example of a system 2000 for facilitating transmission of a request to access an uplink carrier from the first wireless node 805 to the second wireless node 810. The first wireless node 805 may (e.g., be determined to) have a transmission problem 2005 associated with an initial uplink carrier that was (e.g., previously) accessed. For example, the first wireless node 805 may be unable to transmit data, at a desired rate, using the initial uplink carrier. The second wireless node 810 may (e.g., then) (e.g., directly) indicate an (e.g., alternative) uplink carrier to the first wireless node 805 by transmitting uplink carrier indication information 2010 (e.g., associated with the second uplink carrier) to the first wireless node 805. The uplink carrier indication information 2010 may be transmitted using a downlink carrier.

The first wireless node 805 may (e.g., then) (e.g., directly) access 2015 the second uplink carrier. The accessing 2015 may be associated with the downlink carrier, the initial uplink carrier and/or the uplink carrier. In some examples, the accessing 2015 comprises initiating random access to the uplink carrier. Alternatively and/or additionally, the accessing 2015 comprises initiating non-competitive random access to the uplink carrier. The first wireless node 805 may (e.g., then) transmit a completion message 2020 to the second wireless node 810. The completion message 2020 may be transmitted using the uplink carrier.

Figure 21:
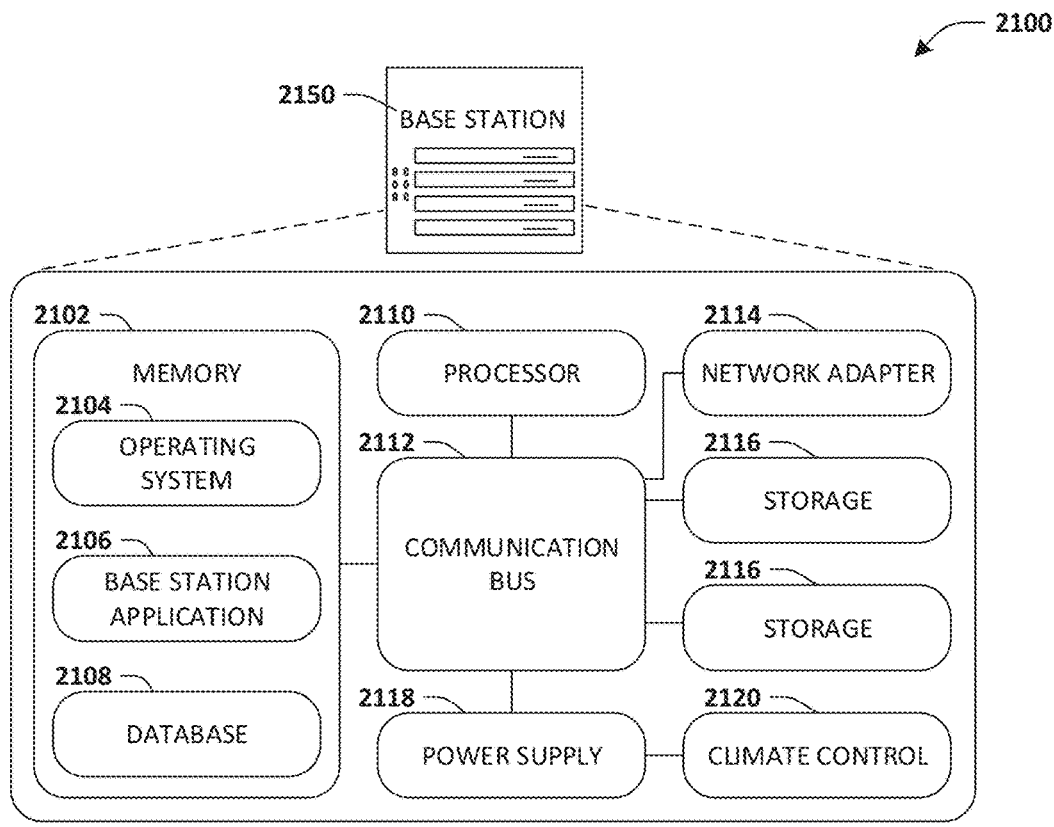
FIG. 21 is an illustration of a scenario involving an example configuration of a base station (BS) that may utilize and/or implement at least a portion of the techniques presented herein.

FIG. 21 presents a schematic architecture diagram 2100 of a base station 2150 (e.g., a node) that may utilize at least a portion of the techniques provided herein. Such a base station 2150 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 2150 may connect one or more user equipment (UE) to a (e.g., wireless) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA13000, Global System for Mobile Communications (GSM), Evolved UTRA (E-UTRA), IEEE 802.11, IEEE 802.16, IEEE 802.20, Flash-OFDM, etc. The base station 2150 and/or the network may communicate using a standard, such as Long-Term Evolution (LTE).

The base station 2150 may comprise one or more (e.g., hardware) processors 2110 that process instructions. The one or more processors 2110 may optionally include a plurality of cores; one or more coprocessors, such as a mathematics coprocessor or an integrated graphical processing unit (GPU); and/or one or more layers of local cache memory. The base station 2150 may comprise memory 2102 storing various forms of applications, such as an operating system 2104; one or more base station applications 2106; and/or various forms of data, such as a database 2108 and/or a file system, etc. The base station 2150 may comprise a variety of peripheral components, such as a wired and/or wireless network adapter 2114 connectible to a local area network and/or wide area network; one or more storage components 2116, such as a hard disk drive, a solid-state storage device (SSD), a flash memory device, and/or a magnetic and/or optical disk reader; and/or other peripheral components.

The base station 2150 may comprise a mainboard featuring one or more communication buses 2112 that interconnect the processor 2110, the memory 2102, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 2112 may interconnect the base station 2150 with at least one other server. Other components that may optionally be included with the base station 2150 (though not shown in the schematic diagram 2100 of FIG. 21) include a display; a display adapter, such as a graphical processing unit (GPU); input peripherals, such as a keyboard and/or mouse; and/or a flash memory device that may store a basic input/output system (BIOS) routine that facilitates booting the base station 2150 to a state of readiness, etc.

The base station 2150 may operate in various physical enclosures, such as a desktop or tower, and/or may be integrated with a display as an "all-in-one" device. The base station 2150 may be mounted horizontally and/or in a cabinet or rack, and/or may simply comprise an interconnected set of components. The base station 2150 may comprise a dedicated and/or shared power supply 2118 that supplies and/or regulates power for the other components. The base station 2150 may provide power to and/or receive power from another base station and/or server and/or other devices. The base station 2150 may comprise a shared and/or dedicated climate control unit 2120 that regulates climate properties, such as temperature, humidity, and/or airflow. Many such base stations 2150 may be configured and/or adapted to utilize at least a portion of the techniques presented herein.

Figure 22:
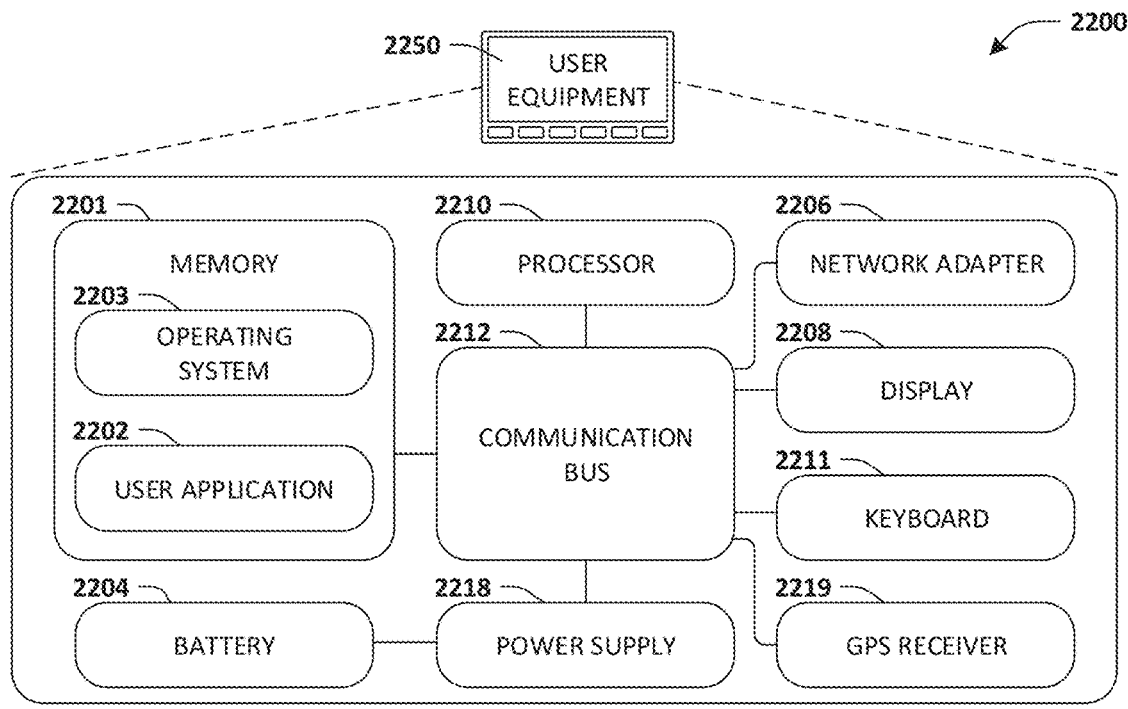
FIG. 22 is an illustration of a scenario involving an example configuration of a user equipment (UE) that may utilize and/or implement at least a portion of the techniques presented herein.

FIG. 22 presents a schematic architecture diagram 2200 of a user equipment (UE) 2250 (e.g., a node) whereupon at least a portion of the techniques presented herein may be implemented. Such a UE 2250 may vary widely in configuration and/or capabilities, in order to provide a variety of functionality to a user. The UE 2250 may be provided in a variety of form factors, such as a mobile phone (e.g., a smartphone); a desktop or tower workstation; an "all-in-one" device integrated with a display 2208; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 2250 may serve the user in a variety of roles, such as a telephone, a workstation, kiosk, media player, gaming device, and/or appliance.

The UE 2250 may comprise one or more (e.g., hardware) processors 2210 that process instructions. The one or more processors 2210 may optionally include a plurality of cores; one or more coprocessors, such as a mathematics coprocessor or an integrated graphical processing unit (GPU); and/or one or more layers of local cache memory. The UE 2250 may comprise memory 2201 storing various forms of applications, such as an operating system 2203; one or more user applications 2202, such as document applications, media applications, file and/or data access applications, communication applications, such as web browsers and/or email clients, utilities, and/or games; and/or drivers for various peripherals. The UE 2250 may comprise a variety of peripheral components, such as a wired and/or wireless network adapter 2206 connectible to a local area network and/or wide area network; one or more output components, such as a display 2208 coupled with a display adapter (optionally including a graphical processing unit (GPU)), a sound adapter coupled with a speaker, and/or a printer; input devices for receiving input from the user, such as a keyboard 2211, a mouse, a microphone, a camera, and/or a touch-sensitive component of the display 2208; and/or environmental sensors, such as a GPS receiver 2219 that detects the location, velocity, and/or acceleration of the UE 2250, a compass, accelerometer, and/or gyroscope that detects a physical orientation of the UE 2250. Other components that may optionally be included with the UE 2250 (though not shown in the schematic architecture diagram 2200 of FIG. 22) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 2250 to a state of readiness; and/or a climate control unit that regulates climate properties, such as temperature, humidity, and airflow, etc.

The UE 2250 may comprise a mainboard featuring one or more communication buses 2212 that interconnect the processor 2210, the memory 2201, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 2250 may comprise a dedicated and/or shared power supply 2218 that supplies and/or regulates power for other components, and/or a battery 2204 that stores power for use while the UE 2250 is not connected to a power source via the power supply 2218. The UE 2250 may provide power to and/or receive power from other client devices.

Figure 23:
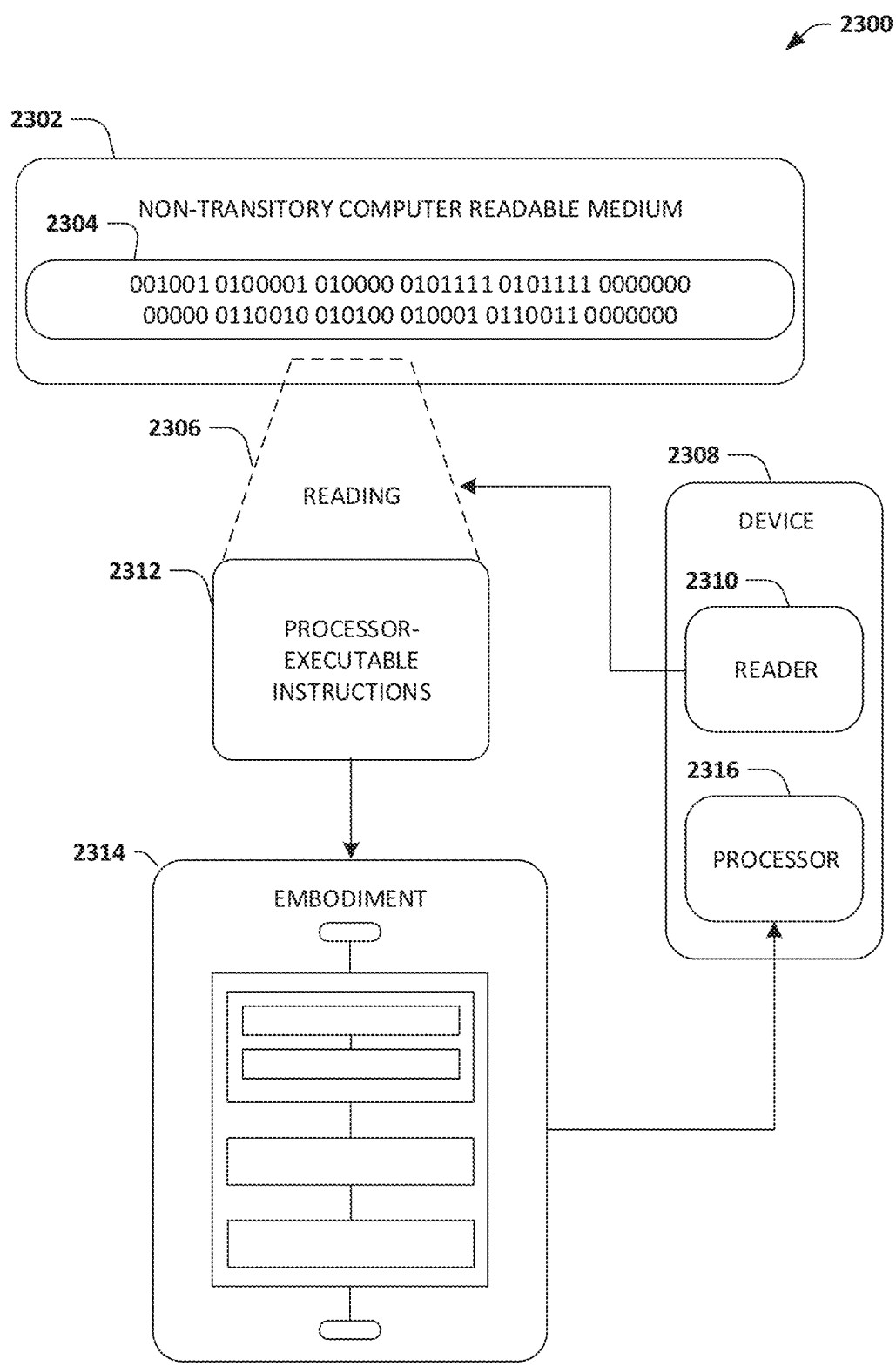
FIG. 23 is an illustration of a scenario featuring an example non-transitory computer readable medium in accordance with one or more of the provisions set forth herein.

FIG. 23 is an illustration of a scenario 2300 involving an example non-transitory computer readable medium 2302. The non-transitory computer readable medium 2302 may comprise processor-executable instructions 2312 that when executed by a processor 2316 cause performance (e.g., by the processor 2316) of at least some of the provisions herein. The non-transitory computer readable medium 2302 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 2302 stores computer-readable data 2304 that, when subjected to reading 2306 by a reader 2310 of a device 2308 (e.g., a read head of a hard disk drive, or a read operation invoked on a solid-state storage device), express the processor-executable instructions 2312. In some embodiments, the processor-executable instructions 2312, when executed, cause performance of operations, such as at least some of the example method 100 of FIG. 1, the example method 200 of FIG. 2, the example method 300 of FIG. 3, the example method 400 of FIG. 4, the example method 500 of FIG. 5, the example method 600 of FIG. 6A, the example method 650 of FIG. 6B and/or the example method 700 of FIG. 7, for example. In some embodiments, the processor-executable instructions 2312 are configured to cause implementation of a system and/or scenario, such as at least some of the example system 800 of FIG. 8, the example system 900 of FIG. 9, the example system 1000 of FIG. 10, the example system 1100 of FIG. 11, the example system 1200 of FIG. 12, the example system 1300 of FIG. 13, the example system 1400 of FIG. 14, the example system 1500 of FIG. 15, the example system 1600 of FIG. 16, the example system 1700 of FIG. 17, the example system 1800 of FIG. 18, the example system 1900 of FIG. 19 and/or the example system 2000 of FIG. 20, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    receiving information corresponding to a plurality of uplink carriers, wherein the information comprises an indication of a frequency of an uplink carrier, a random access channel (RACH) common configuration, and a time alignment (TA) timer common configuration;
    selecting one uplink carrier from the plurality of uplink carriers based upon the information,
        wherein the selection is based on comparing a Reference Signal Received Power (RSRP) of a downlink carrier to a threshold,
        wherein the one uplink carrier has a first frequency in response to the RSRP being below the threshold,
        wherein the one uplink carrier has a second frequency in response to the RSRP being above the threshold,
        wherein the first frequency is lower than the second frequency,
        wherein the one uplink carrier is selected in response to determining a transmission problem with the uplink carrier of the plurality of uplink carriers, and
        wherein the determining the transmission problem includes determining that a random access preamble is transmitted using the uplink carrier up to a threshold number of times; and
    performing random access using the one uplink carrier.

2. The method of claim 1, wherein the determining the transmission problem includes determining that a data packet is transmitted using the uplink carrier up to a threshold number of times.

3. The method of claim 1, wherein a priority of the uplink carrier is lowered in response to the determining that the random access preamble is transmitted using the uplink carrier up to the threshold number of times.

4. The method of claim 1, further comprising:
transmitting a request using the one uplink carrier after the random access is performed;
receiving a confirmation message that indicates that the one uplink carrier is available; and
transmitting, using the one uplink carrier, a completion message in response to the receiving the confirmation message.

5. The method of claim 1, further comprising:
receiving a rejection message that indicates that the one uplink carrier is not available for access;
transmitting data using a previously accessed uplink carrier in response to the receiving the rejection message.

6. An apparatus comprising a processor configured to:
receive information corresponding to a plurality of uplink carriers, wherein the information comprises an indication of a frequency of an uplink carrier, a random access channel (RACH) common configuration, and a time alignment (TA) timer common configuration;
select one uplink carrier from the plurality of uplink carriers based upon the information,
wherein the selection is based on comparing a Reference Signal Received Power (RSRP) of a downlink carrier to a threshold,
wherein the one uplink carrier has a first frequency in response to the RSRP being below the threshold,
wherein the one uplink carrier has a second frequency in response to the RSRP being above the threshold,
wherein the first frequency is lower than the second frequency,
wherein the one uplink carrier is selected in response to the processor being configured to determine a transmission problem with the uplink carrier of the plurality of uplink carriers, and
wherein the determined transmission problem includes the processor being configured to determine that a random access preamble is transmitted using the uplink carrier up to a threshold number of times; and
perform random access using the one uplink carrier.

7. The apparatus of claim 6, wherein the determined the transmission problem includes the processor being configured to determine that a data packet is transmitted using the uplink carrier up to a threshold number of times.

8. The apparatus of claim 6, wherein the processor is configured to lower a priority of the uplink carrier in response to the determine that the random access preamble is transmitted using the uplink carrier up to the threshold number of times.

9. The apparatus of claim 6, wherein the processor is further configured to:
transmit a request using the one uplink carrier after the random access is performed;
receive a confirmation message that indicates that the one uplink carrier is available; and
transmit, using the one uplink carrier, a completion message in response to the receive the confirmation message.

10. The apparatus of claim 6, wherein the processor is further configured to:

receive a rejection message that indicates that the one uplink carrier is not available for access;
transmit data using a previously accessed uplink carrier in response to the receive the rejection message.

11. A non-transitory computer readable medium comprising processor executable instructions that when executed by a processor configures the processor to perform a method comprising:
receiving information corresponding to a plurality of uplink carriers, wherein the information comprises an indication of a frequency of an uplink carrier, a random access channel (RACH) common configuration, and a time alignment (TA) timer common configuration;
selecting one uplink carrier from the plurality of uplink carriers based upon the information,
wherein the selection is based on comparing a Reference Signal Received Power (RSRP) of a downlink carrier to a threshold,
wherein the one uplink carrier has a first frequency in response to the RSRP being below the threshold,
wherein the one uplink carrier has a second frequency in response to the RSRP being above the threshold,
wherein the first frequency is lower than the second frequency,
wherein the one uplink carrier is selected in response to determining a transmission problem with the uplink carrier of the plurality of uplink carriers, and
wherein the determining the transmission problem includes determining that a random access preamble is transmitted using the uplink carrier up to a threshold number of times; and
performing random access using the one uplink carrier.

12. The non-transitory computer readable medium of claim 11, wherein the determining the transmission problem includes determining that a data packet is transmitted using the uplink carrier up to a threshold number of times.

13. The non-transitory computer readable medium of claim 11, wherein a priority of the uplink carrier is lowered in response to the determining that the random access preamble is transmitted using the uplink carrier up to the threshold number of times.

14. The non-transitory computer readable medium of claim 11, wherein the method further comprises:
transmitting a request using the one uplink carrier after the random access is performed;
receiving a confirmation message that indicates that the one uplink carrier is available; and
transmitting, using the one uplink carrier, a completion message in response to the receiving the confirmation message.

15. The non-transitory computer readable medium of claim 11, wherein the method further comprises:
receiving a rejection message that indicates that the one uplink carrier is not available for access;
transmitting data using a previously accessed uplink carrier in response to the receiving the rejection message.

16. A system comprising:
a base station configured to:
transmit information corresponding to a plurality of uplink carriers, wherein the information comprises an indication of a frequency of an uplink carrier, a random access channel (RACH) common configuration, and a time alignment (TA) timer common configuration;
a wireless device configured to:
receive the information corresponding to the plurality of uplink carriers;

select one uplink carrier from the plurality of uplink carriers based upon the information,
   wherein the selection is based on comparing a Reference Signal Received Power (RSRP) of a downlink carrier to a threshold,
   wherein the one uplink carrier has a first frequency in response to the RSRP being below the threshold,
   wherein the one uplink carrier has a second frequency in response to the RSRP being above the threshold,
   wherein the first frequency is lower than the second frequency,
   wherein the one uplink carrier is selected in response to the wireless device being configured to determine a transmission problem with the uplink carrier of the plurality of uplink carriers, and
   wherein the determined the transmission problem includes the wireless device being configured to determine that a random access preamble is transmitted using the uplink carrier up to a threshold number of times; and
perform random access using the one uplink carrier.

17. The system of claim 16, wherein the determining the transmission problem includes the wireless device being configured to determine that a data packet is transmitted using the uplink carrier up to a threshold number of times.

18. The system of claim 16, wherein the wireless device is configured to lower a priority of the uplink carrier in response to the determine that the random access preamble is transmitted using the uplink carrier up to the threshold number of times.

19. The system of claim 16, wherein the wireless device is further configured to:
   transmit a request using the one uplink carrier after the random access is performed;
   receive a confirmation message that indicates that the one uplink carrier is available; and
   transmit, using the one uplink carrier, a completion message in response to the receive the confirmation message.

20. The system of claim 16, wherein the wireless device is further configured to:
   receive a rejection message that indicates that the one uplink carrier is not available for access;
   transmit data using a previously accessed uplink carrier in response to the receive the rejection message.

* * * * *